US012755674B2

(12) United States Patent
Lee et al.

(10) Patent No.: US 12,755,674 B2
(45) Date of Patent: Oct. 6, 2026

(54) DISPLAY PIXEL COMPRISING ELECTROLUMINESCENT SOURCES

(71) Applicant: Aledia, Echirolles (FR)

(72) Inventors: Jaehoon Lee, Grenoble (FR); Frédéric Mercier, Coublevie (FR)

(73) Assignee: Aledia, Champagnier (FR)

(*) Notice: Subject to any disclaimer, the term of this patent is extended or adjusted under 35 U.S.C. 154(b) by 0 days.

(21) Appl. No.: 18/876,176

(22) PCT Filed: Jun. 16, 2023

(86) PCT No.: PCT/EP2023/066288
§ 371 (c)(1),
(2) Date: Dec. 17, 2024

(87) PCT Pub. No.: WO2023/247367
PCT Pub. Date: Dec. 28, 2023

(65) Prior Publication Data

US 2026/0073841 A1 Mar. 12, 2026

(30) Foreign Application Priority Data

Jun. 20, 2022 (FR) ...................................... 2206042

(51) Int. Cl.
*G09G 3/32* (2016.01)

(52) U.S. Cl.
CPC ....... *G09G 3/32* (2013.01); *G09G 2310/0286* (2013.01); *G09G 2310/08* (2013.01); *G09G 2330/021* (2013.01)

(58) Field of Classification Search
CPC ............. G09G 3/32; G09G 2310/0286; G09G 2310/08; G09G 2330/021
See application file for complete search history.

(56) References Cited

U.S. PATENT DOCUMENTS 7,227,519 B1* 6/2007 Kawase ............... G09G 3/2081 345/77
2002/0012008 A1 1/2002 Takagi
2009/0051712 A1 2/2009 Arai et al.
2021/0049957 A1* 2/2021 Lee ...................... G09G 3/2014
(Continued)

FOREIGN PATENT DOCUMENTS

EP 1 225 557 A1 7/2002
KR 20060127356 A 12/2006
KR 102148473 B1 * 8/2020 ............. H05B 45/10

OTHER PUBLICATIONS

International Search Report and Written Opinion for International Application No. PCT/EP2023/066288, mailed Sep. 27, 2023.

*Primary Examiner* — Amit Chatly
(74) *Attorney, Agent, or Firm* — Wolf, Greenfield & Sacks, P.C.

(57) ABSTRACT

A display pixel for a display screen including a light-emitting circuit including at least a first electroluminescent source, a controllable current source for driving the light-emitting circuit with current pulses and a driver circuit for controlling the current source, the driver circuit being configured to receive a digital signal and to control the current source for supplying the current pulses modulated by pulse-width modulation and modulated by pulse-amplitude modulation based on the bits of the digital signal.

22 Claims, 12 Drawing Sheets

(56) References Cited

U.S. PATENT DOCUMENTS

| | | | | |
|---|---|---|---|---|
| 2022/0044643 | A1* | 2/2022 | Gu | G09G 3/32 |
| 2023/0154391 | A1* | 5/2023 | Kwak | G09G 3/32 345/55 |

* cited by examiner

DISPLAY PIXEL COMPRISING ELECTROLUMINESCENT SOURCES

This application is a national stage filing under 35 U.S.C. 371 of International Patent Application Serial No. PCT/EP2023/066288, filed on Jun. 16, 2023, which claims priority of French patent application 22/06042, filed on June 20, 2022. The contents of these applications are incorporated herein by reference in their entirety.

TECHNICAL FIELD

The present disclosure concerns a display pixel comprising electroluminescent sources, for example light-emitting diodes, and a display screen having such display pixels.

BACKGROUND ART

A pixel of an image corresponds to the unit element of the image displayed by a display screen. For the display of color images, the display screen generally comprises, for the display of each pixel of the image, at least three components, also called display sub-pixels, which each emit a light radiation, called image pixel color component substantially in a single color (for example, red, green, and blue). The superposition of the image pixel color components emitted by the three display sub-pixels provides the observer with the colored sensation corresponding to the pixel of the displayed image. In this case, the assembly formed by the three display sub-pixels used for the display of a pixel of an image is called display pixel of the display screen. Each display sub-pixel may comprise a light source, particularly a light-emitting diode.

The display pixels may be distributed in an array, each display pixel being located at the intersection of a row (or line) and of a column of the array. Generally, each row of display pixels is successively selected, and the display pixels of the selected row are programmed to display the desired image pixels.

An active array is a screen drive architecture enabling to maintain all the pixel rows active for the entire duration of an image, conversely to arrays said to be passive, where each row is only active for a time T=Tframe/M (where Tframe is the duration of the display of the whole image and M is the number of lines of the screen). This enables to increase the luminosity of the display screen. Further, it is possible to send low voltage or current levels on the array control lines, which enables to display bigger data flows.

It is known to control a electroluminescent source, for example a light emitting diode, by pulse-width modulation, also called PWM (English acronym for Pulse Width Modulation). This type of control consists in circulating successive current pulses of constant intensity in the light-emitting diode, the pulses being repeated cyclically, the duty cycle determining the light intensity emitted by the light-emitting diode. Such a control advantageously makes it possible to operate the light-emitting diode at its optimum operating point where the efficiency of the light-emitting diode, equal to the ratio between the light power emitted by the light-emitting diode and the electrical power consumed by the light-emitting diode, is maximum.

Color depth, also known as bit depth, is the number of bits used to code the color for each image pixel color component of a single display pixel. It is usually desirable the color depth to be high. However, the implementation of pulse-width modulation with high color depth may lead to complex display driving architectures, in particular since the generation of the pulse-width modulation pulses may require the generation of numerous clock signals when the color depth increases.

SUMMARY OF INVENTION

An object of an embodiment is to provide a display pixel comprising electroluminescent sources and a display screen comprising such display pixels overcoming all or part of the disadvantages of existing display pixels comprising electroluminescent sources and display screens comprising such display pixels.

Another object of an embodiment is to control by pulse-width modulation display pixels having a high color depth.

Another object of an embodiment is to reduce the duration of a cycle for the control of the electroluminescent source.

One embodiment provides a display pixel for a display screen comprising a light-emitting circuit comprising at least a first electroluminescent source, a controllable current source for driving the light-emitting circuit with current pulses and a driver circuit for controlling the current source, the driver circuit being configured to receive a digital signal comprising first bits and one second bit, the second bit being different from the first bits, and to control the current source for supplying the current pulses modulated by pulse-width modulation and modulated by pulse-amplitude modulation based on the bits of the digital signal. The driver circuit is configured to command the current source to provide a current that is the sum of successive first current pulses having a constant intensity and first durations that depend on the first bits of the digital signal and a second current pulse commanded by the second bit of the digital signal and having a constant second duration, the sum of the first durations being inferior or equal to the second duration. This allows advantageously the number of clock signals to be reduced.

With respect to a control using only pulse-width modulation, the present embodiment allows advantageously to reduce the duration of a cycle of control of the electroluminescent source while maintaining the same color depth.

According to an embodiment, the current source is configured to generate the successive first current pulses while the second current pulse is generated.

According to an embodiment, the bits of the digital signal are ranked from the most significant bit to the least significant bit and the intensity of the second current pulse depends on the rank of the second bit of the digital signal.

According to an embodiment, the second bit comprises the most significant bit of the digital signal. This allows to modify the current intensity in the electroluminescent source only for high values of the digital signal. In particular, when the electroluminescent source comprises a three-dimensional light-emitting diode, this allows to limit the wavelength shifting of the light emitted by the light-emitting diode, that can occur when the intensity of the current circulating through the light-emitting diode varies, only to the high values of the digital signal.

According to an embodiment, the digital signal comprises a third bit different from the first bits and the second bit. The driver circuit is configured to command the controllable current source to provide the current that is the sum of the successive first current pulses, the second current pulse, and a third current pulse commanded by the third bit of the digital signal and having the second duration.

According to an embodiment, the current source is configured to generate the third current pulse simultaneously with the second current pulse. According to an embodiment, the intensity of the third current pulse depends on the rank of the third bit of the digital signal and is different from the intensity of the second current pulse. According to an embodiment, the third bit is the second most significant bit of the digital signal.

This allows advantageously to further reduce the number of clock signals necessary to perform the pulse-amplitude modulation, and therefore to reduce the duration of the duration of a cycle of control of the electroluminescent source.

According to an embodiment, the digital signal comprises a fourth bit different from the first bits, the second bit, and the third bit. The driver circuit is configured to command the controllable current source to provide the current that is the sum of the successive first current pulses, the second current pulse, the third current pulse, and a current fourth pulse commanded by the fourth bit of the digital signal and having the second duration.

According to an embodiment, the current source is configured to generate the fourth current pulse simultaneously with the second current pulse. According to an embodiment, the intensity of the fourth current pulse depends on the rank of the fourth bit of the digital signal and is different from the intensity of the second current pulse and the intensity of the third current pulse. According to an embodiment, the fourth bit is the third most significant bit of the digital signal.

This allows advantageously to further reduce the number of clock signals necessary to perform the pulse-amplitude modulation, and therefore to reduce the duration of the duration of a cycle of control of the electroluminescent source.

According to an embodiment, the driver circuit comprises a first storage circuit for storing said first bits of the digital signal and the first storage circuit comprises a shift register clocked by a pulse-width modulation clock signal. The structure of the driver circuit of the display pixel is advantageously simple and can take a reduced silicon area when the driver circuit is manufactured in an integrated way.

According to an embodiment, the driver circuit comprises a second storage circuit for storing said second bit of the digital signal, and a logic circuit controlled by a control signal and configured to receive successively the first bits from the shift register clocked by the pulse-width modulation clock signal and to receive the said second bit from the second storage circuit and to control the controllable current source from the successively received first bits and the second bit when the control signal is in a given state. This advantageously allows to control the duration of a display phase.

According to an embodiment, the light-emitting circuit comprises a first group of electroluminescent sources having a first number of electroluminescent sources and a second group of electroluminescent sources having a second number of electroluminescent sources. The controllable current source comprises a first controllable current source commanded by the first bits and connected to the electroluminescent sources of the first group and a second controllable current source commanded by the second bit and connected to the electroluminescent sources of second group. This allows the current density in each electroluminescent source to be the same.

According to an embodiment, the controllable current source comprises:

- a first MOS transistor connected to the light-emitting circuit and a first switch connected to the first MOS transistor; and
- a second MOS transistor connected to the light-emitting circuit and a second switch connected to second MOS transistor.

The structure of the controllable current source of the display pixel is advantageously simple.

According to an embodiment, the logic circuit is configured to control the first switch successively from each first bit, and to control the second switch based on said second bit.

According to an embodiment, the driver circuit is configured to control only the first switch based on some the first bits and to control both the first switch and the second switch based on the other of the first bits.

According to an embodiment, the electroluminescent sources of the first group of electroluminescent are connected to the first MOS transistor and the electroluminescent sources of the second group are connected to the second MOS transistor. This allows the current density in each electroluminescent source to be the same.

According to an embodiment, the light-emitting circuit comprises a third group of electroluminescent sources having a third number of light-emitting diodes and wherein the control source comprises a third MOS transistor connected to the electroluminescent sources of the third group and a third switch connected to the third MOS transistor, wherein the first number is equal to the second number, and wherein the third number is greater than the second number.

One embodiment also provides a display screen comprising an array of display pixels as previously defined.

According to an embodiment, the display screen comprises a circuit configured to modify a supply voltage of the display pixels according to the second bit. This allows advantageously to reduce the power consumption of the display with an easy-to-use command.

BRIEF DESCRIPTION OF DRAWINGS

The foregoing features and advantages, as well as others, will be described in detail in the following description of specific embodiments given by way of illustration and not limitation with reference to the accompanying drawings, in which.

DESCRIPTION OF EMBODIMENTS

Figure 1:
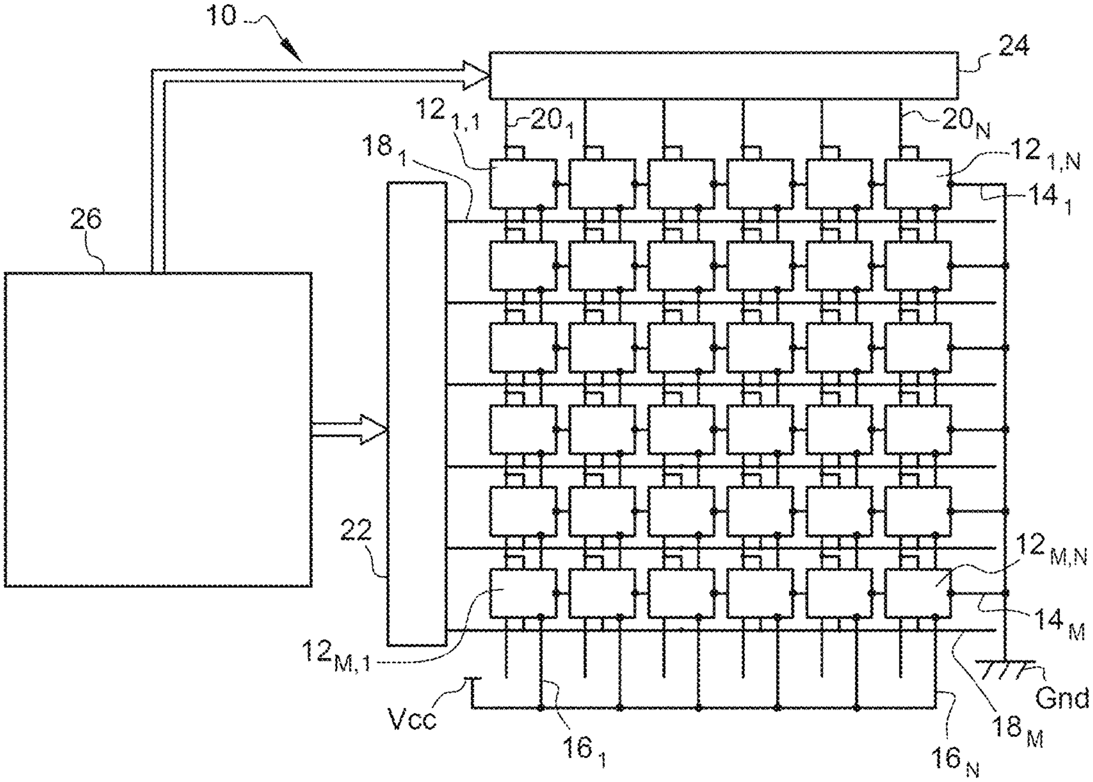
FIG. 1 partially and schematically shows an example of a display screen.

Like features have been designated by like references in the various figures. In particular, the structural and/or functional features that are common among the various embodiments may have the same references and may dispose identical structural, dimensional and material properties. For the sake of clarity, only the steps and elements that are useful for an understanding of the embodiments described herein have been illustrated and described in detail.

Unless indicated otherwise, when reference is made to two elements connected together, this signifies a direct connection without any intermediate elements other than conductors, and when reference is made to two elements coupled together, this signifies that these two elements can be connected or they can be coupled via one or more other elements. Further, a signal which alternates between a first constant state, for example, a low state, noted “0”, and a second constant state, for example, a high state, noted “1”, is called a “binary signal”. The high and low states of different binary signals of a same electronic circuit may be different. In practice, the binary signals may correspond to voltages or to currents which may not be perfectly constant in the high or low state. Further, in the following description, the source and the drain of a MOS transistor are called “power terminals” of the insulated gate field-effect transistor, or MOS transistor.

Further, unless indicated otherwise, when it is spoken of a voltage at a conductive pad, the difference between the potential at said conductive pad and a reference potential, for example, the ground, taken as equal to 0 V, is considered.

Unless specified otherwise, the expressions “around”, “approximately”, “substantially” and “in the order of” signify within 10%, and preferably within 5%. Further the expression “substantially constant” means which varies by less than 10% over time with respect to a reference value.

Pulse-width modulation drive of an electroluminescent source, for example a light-emitting diode, consists in circulating, in the electroluminescent source, successive pulses of current having a constant intensity with varying durations. Pulse-amplitude modulation drive of an electroluminescent source, for example a light-emitting diode, consists in circulating, in the electroluminescent source, successive pulses of current having a constant duration with varying intensities.

In the following specification, embodiments are disclosed for display pixels comprising light-emitting diodes. However, these embodiments can be implemented for display pixels comprising electroluminescent sources different from light-emitting diodes, for example organic light-emitting diodes, field-induced polymer electroluminescent components, laser diodes.

In the following specification, embodiments are disclosed for a color display screen comprising color display pixels, each display pixel comprising light-emitting diodes adapted to emit radiations of different colors. However, these embodiments also apply for a monochromatic display screen comprising monochromatic display pixels, each monochromatic display pixel comprising one light-emitting diode or light-emitting diodes adapted to emit a radiation of a single color.

FIG. 1 partially and schematically shows an example of a display screen 10. Display screen 10 comprises display pixels $\mathbf{12}_{i,j}$, for example, arranged in M rows and in N columns, M being an integer varying from 1 to 8,000 and N being an integer varying from 1 to 16,000, i being an integer varying from 1 to M, and j being an integer varying from 1 to N. As an example, in FIG. 1, M and N are equal to 6. Each display pixel $\mathbf{12}_{i,j}$ is coupled to a source of a low reference potential Gnd, for example, the ground, via an electrode $\mathbf{14}_i$ and to a source of a high reference potential Vcc via an electrode $\mathbf{16}_j$. As an example, electrodes $\mathbf{14}_i$ are shown as being aligned along the rows in FIG. 1 and electrodes $\mathbf{16}_j$ are shown as being aligned along the columns in FIG. 1, the reverse layout being possible. The power supply voltage of the display screen corresponds to the voltage between high reference potential Vcc and low reference potential Gnd. The power supply voltage particularly depends on the arrangement of the light-emitting diodes and on the technology according to which the light-emitting diodes are manufactured. As an example, the power supply voltage may be in the order of from 4 V to 5 V.

For each row, the display pixels $\mathbf{12}_{i,j}$ in the row are coupled to at least one row electrode $\mathbf{18}_i$. For each column, the display pixels $\mathbf{12}_{i,j}$ in the column are coupled to at least one column electrode $\mathbf{20}_j$. Display screen 10 comprises a selection circuit 22 coupled to row electrodes $\mathbf{18}_i$ and adapted to delivering signals on the row electrodes $\mathbf{18}_i$. Display screen 10 comprises a data delivery circuit 24 coupled to column electrodes $\mathbf{20}_j$ and adapted to delivering data on the column electrodes $\mathbf{20}_j$. Selection circuit 22 and control circuit 24 are controlled by a circuit 26, for example comprising a microprocessor.

Figure 2:
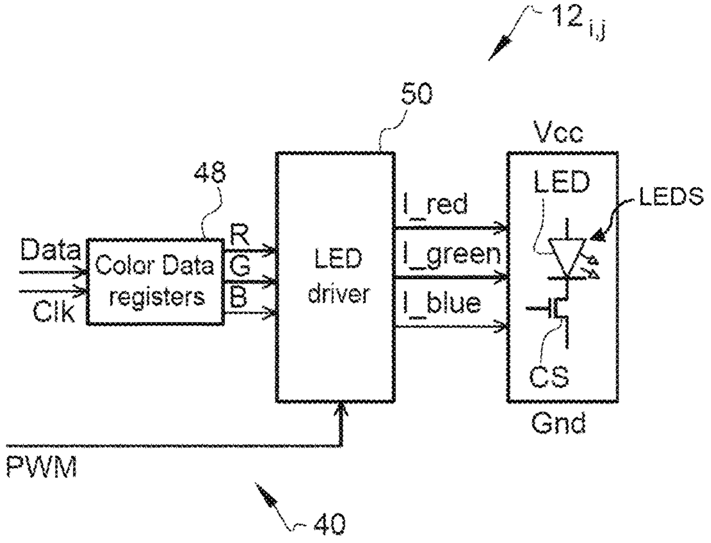
FIG. 2 shows an example of a block diagram of a display pixel of the display screen of FIG. 1.

FIG. 2 shows an example of a block diagram of a display pixel $\mathbf{12}_{i,j}$ of display screen 10. For a color display screen, display pixel $\mathbf{12}_{i,j}$ comprises a light-emitting circuit LEDS comprising at least three light-emitting diodes emitting radiations of different colors, a single light-emitting diode LED being shown in FIG. 2. Each light-emitting diode LED is series-coupled to a controllable current source CS, for example comprising a MOS transistor. In the present example, for each light-emitting diode LED, the anode of light-emitting diode LED receives high reference potential Vcc and the cathode of light-emitting diode LED is for example coupled to a terminal of controllable current source CS, the other terminal of controllable current source CS receiving low reference potential Gnd.

Display pixel $12_{i,j}$ further comprises a driver circuit 40 for driving controllable current source CS. Driver circuit 40 may particularly comprise electronic components such as MOS transistors. Driver circuit 40 comprises a storage circuit 48 (Color Data registers) clocked by a clock signal Clk configured to store digital color signals R, G, B based on received digital data Data. Digital color signals R, G, B comprise each a number NB of bits and are representative of the image pixel color components to be displayed. Driver circuit 40 comprises a circuit 50 (LED driver) configured to control the controllable current sources CS coupled to light-emitting diodes LED with signals I_red, I_green, and I_blue, obtained from digital color signals R, G, B, and from a signal PWM.

Figure 3:
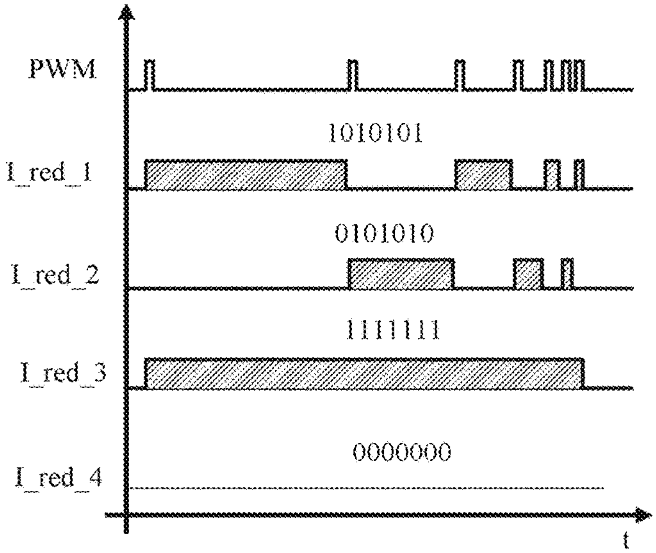
FIG. 3 shows examples of timing diagrams of a signal used by the display pixel of FIG. 2 for controlling a light-emitting diode by pulse-width modulation and of the current supplied to the light-emitting diode.

FIG. 3 shows a timing diagram of signal PWM and signals I_red_1, I_red_2, I_red_3, and I_red_4 corresponding to signal I_red provided by circuit 50 of display pixel $12_{i,j}$ of FIG. 2 for the display of four different color signals R. According to an embodiment, light-emitting diodes LED of display pixel $12_{i,j}$ are controlled by pulse-width modulation. For this purpose, during a display phase, signal PWM exhibits the succession of pulses at logical state "1" which rates the operation of circuit 50 for the control of light-emitting diodes LED by pulse-width modulation. The number of pulses in the succession of pulses corresponds to the number NB of bits of each digital color signal R, G, and B.

As an example, when current source CS corresponds to a MOS transistor, this transistor is turned on or is turned off, at the rate of the pulses of signal PWM, according to the logical value "0" or "1" of each bit of color signal R, G, or B, starting by the most significant bit, this transistor being maintained on or off until the next pulse of signal PWM. The duration between two successive pulses of signal PWM is divided each time by two, so that the total duration for which the light-emitting diode is on depends on the value of color signal R, G, or B. The succession of pulses of signal PWM can be repeated until the display of another image pixel. In that case, the succession of pulses of signal PWM forms a display cycle and the display phase comprises more than one display cycle.

In FIG. 3, as an example, the number of pulses in a display cycle of signal PWM is equal to 7 and only one display cycle is shown. Signal I_red_1 is obtained for the display of an image pixel color component corresponding to color signal R equal to "1010101". Signal I_red_2 is obtained for the display of an image pixel color component corresponding to color signal R equal to "0101010". Signal I_red_3 is obtained for the display of an image pixel color component corresponding to color signal R equal to "1111111". Signal I_red_4 is obtained for the display of an image pixel color component corresponding to color signal R equal to "0000000".

Signal PWM can be generated from periodic clock signals. The number of clock signals necessary to generate signal PWM increases with the number NB of bits of color signals R, G, and B. Generating a large number of clock signals can lead to complex circuits. Moreover, the image pixels of a new image to be displayed are successively displayed from the first row to the last row of the display screen.

Figure 4:
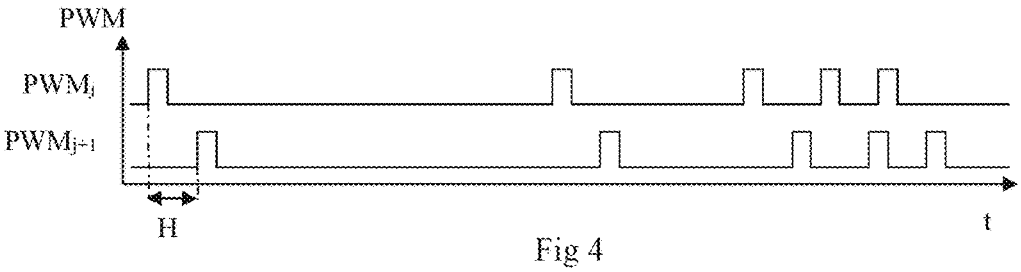
FIG. 4 shows examples of timing diagrams of a signal sent to the display pixels of two successive rows of the display screen of FIG. 1 for controlling light-emitting diodes by pulse-width modulation.

FIG. 4 shows a timing diagram of signals PWM received by the display pixels of a first row (signal $PWM_j$) and a successive second row (signal $PWM_{j+1}$) of the display screen. Signal $PWM_{j+1}$ corresponds to signal $PWM_j$ that is shifted from a duration H equal to Tframe/M where Tframe is the duration of the display of the whole image and M is the number of rows of the display screen. The shift H of signal PWM from a first row to a successive second row can be obtained by providing signal $PWM_j$ to successive latches before providing it to the second row.

Moreover, the electrical power consumed by the display screen 10 when the light-emitting diodes of each display pixel $12_{i,j}$ are controlled by pulse-width modulation does not depend on the brightness of the image that is displayed. It would be desirable that the electrical power consumed by the display screen decreases when the brightness of the displayed image decreases.

According to an embodiment, each display pixel of the display screen is configured, for the display of an image pixel color component corresponding to a digital color signal, to drive the light-emitting circuit by pulse-amplitude modulation (PAM) for some bits of the digital color signal and by pulse-width modulation (PWM) for the other bits of the digital color signal. According to an embodiment, pulse-amplitude modulation is used for at least the most significant bit (MSB) of the digital color signal, and possibly one or more successive bits directly adjacent to the MSB.

According to an embodiment, for the pulse-width modulation, the light-emitting diode is supplied, for each display phase cycle, with current pulses having a constant intensity and variable first durations. According to an embodiment, for the pulse-amplitude modulation, the light-emitting diode is supplied, for each display phase cycle, with a current pulse having a second duration, that is constant, and a variable intensity. The second duration of the pulse of the pulse-amplitude modulation is equal to the complete duration Tcycle of a display phase cycle of the pulse-width modulation. According to an embodiment, at each time during the display cycle of the pulse-width modulation, the intensity of the current supplied to the light-emitting circuit is equal to the sum of the intensity of the current resulting from the pulse-amplitude modulation and the intensity of the current resulting from the pulse-width modulation. According to an embodiment, the complete duration Tcycle of a display phase cycle is also equal to the sum of the first durations of the current pulses due to the pulse-width modulation when all the bits of the digital color signal used for the pulse-width modulation are equal to "1" supplemented by the duration associated to the low significant bit (LSB).

According to an embodiment, pulse-amplitude modulation is used for the MSB of the digital color signal and the second most significant bit (MSB-1) of the digital color signal, that is the bit following the MSB, and pulse-width modulation is used for the other bits of the digital color signal. According to an embodiment, the intensity of the current supplied to the light-emitting circuit, when only the MSB of the digital color signal is equal to "1", is twice the intensity of the current supplied to the light-emitting circuit when only the MSB-1 of the digital color signal is equal to "1". According to an embodiment, the intensity of the current supplied to the light-emitting circuit when only the MSB-1 of the digital color signal is equal to "1" is equal to the intensity of the current supplied to the light-emitting circuit for a pulse of the pulse-width modulation when the MSB MSB-1, and MSB-2 are equal to "0".

According to an embodiment, pulse-amplitude modulation is used for the MSB of the digital color signal, the MSB-1 of the digital color signal, and the third most significant bit (MSB-2) of the digital color signal, that is the bit following the MSB-1, and pulse-width modulation is used for the other bits of the digital color signal. According to an embodiment, the intensity of the current supplied to the light-emitting circuit, when only the MSB of the digital color signal is equal to "1", is twice the intensity of the current supplied to the light-emitting circuit when only the MSB-1 of the digital color signal is equal to "1" and is equal to four times the intensity of the current supplied to the light-emitting circuit when only the MSB-2 of the digital color signal is equal to "1". According to an embodiment, the intensity of the current supplied to the light-emitting circuit, when only the MSB-2 of the digital color signal is equal to "1", is equal to the intensity of the current supplied to the light-emitting circuit for a pulse of the pulse-width modulation when the MSB, the MSB-1, and the MSB-2 are equal to "0".

Figure 5:
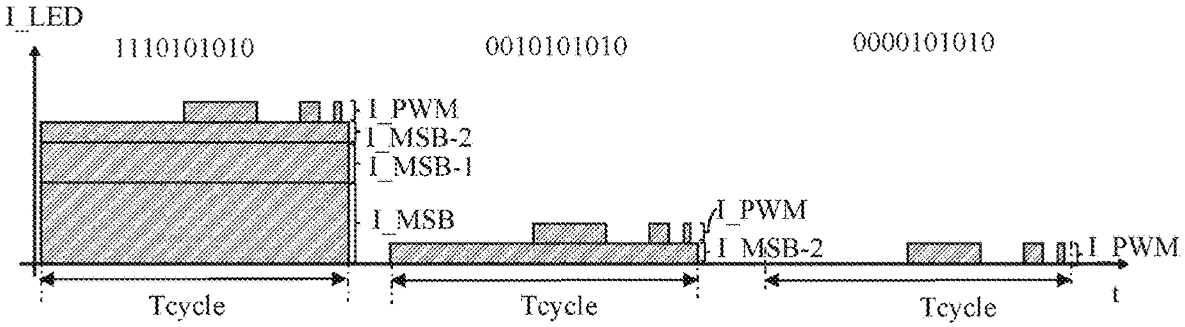
FIG. 5 shows timing diagrams of the current supplied a light-emitting diode for the display of successive digital color signals according to an embodiment of a method for controlling the light-emitting diode.
Figure 6:
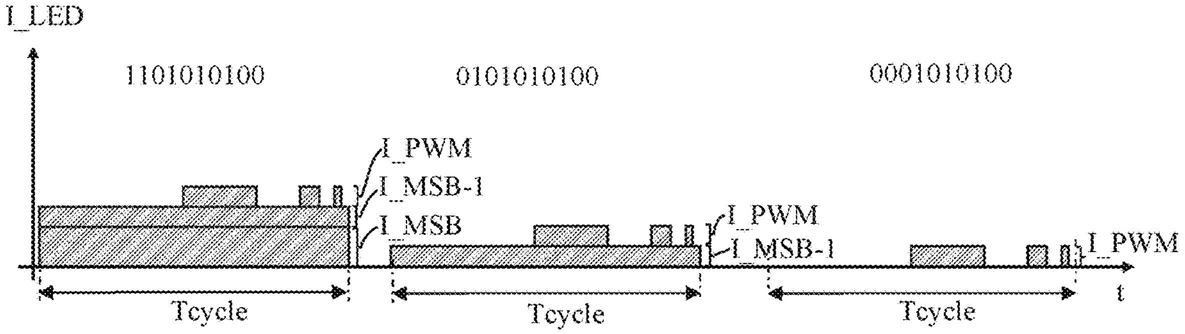
FIG. 6 shows timing diagrams of the current supplied to a light-emitting diode for the display of successive digital color signals according to another embodiment of a method for controlling the light-emitting diode.

FIGS. 5 and 6 show each examples of timing diagrams of current I_LED supplied to the light-emitting circuit of an embodiment of a display pixel to display an image pixel color component coded on a digital color signal having 10 bits for three different digital color signals. Reference I_MSB designates the part of the intensity of current I_LED due to the pulse-amplitude modulation when the MSB is equal to "1". Reference I_MSB-1 designates the part of the intensity of current I_LED due to the pulse-amplitude modulation when the MSB-1 is equal to "1". Reference I_MSB-2 designates the part of the intensity of current I_LED due to the pulse-amplitude modulation when the MSB-2 is equal to "1". Reference I_PWM designates the part of the intensity of current I_LED due to the pulse-width modulation. For FIGS. 5 and 6, the duration of the pulse of the pulse-amplitude modulation is equal to the complete duration of a display phase cycle Tcycle of the pulse-width modulation.

In FIG. 5, pulse-amplitude modulation is used for the MSB, the MSB-1, and the MSB-2 of the digital color signal, and pulse-width modulation is used for the 7 other bits of the digital color signal. The first digital color signal is equal to "1110101010". The second digital color signal is equal to "0010101010". The third digital color signal is equal to "0000101010".

In FIG. 6, pulse-amplitude modulation is used for the MSB, and the MSB-1 of the digital color signal, and pulse-width modulation is used for the 8 other bits of the digital color signal. The first digital color signal is equal to "1101010100". The second digital color signal is equal to "0101010100". The third digital color signal is equal to "0001010100".

Figure 7:
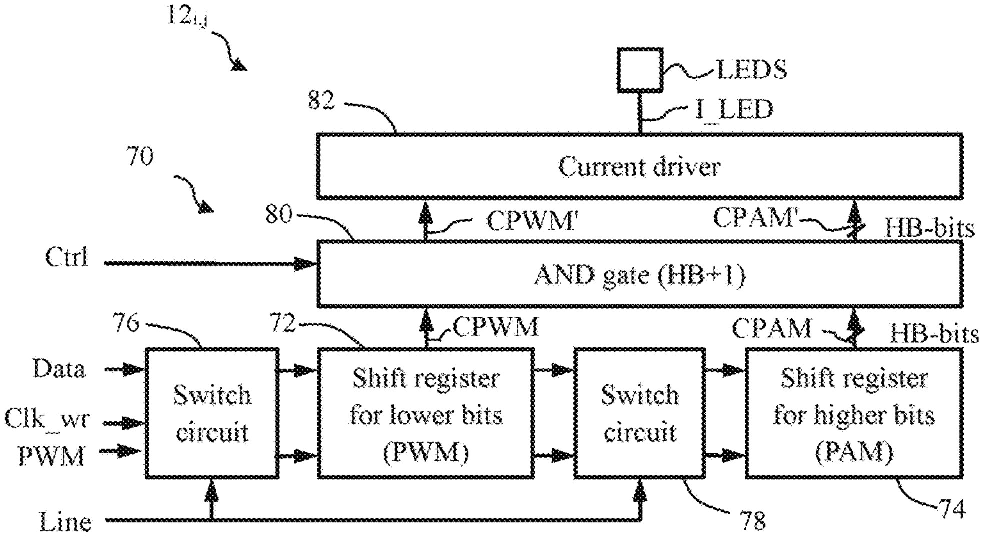
FIG. 7 shows an embodiment of a block diagram of a display pixel of the display screen of FIG. 1.

FIG. 7 shows an embodiment of a block diagram of the display pixel $\mathbf{12}_{i,j}$ of FIG. 1 configured to implement the driving of the light-emitting diodes disclosed previously in relation to FIGS. 5 and 6.

The display pixel $\mathbf{12}_{i,j}$ comprises all the elements previously disclosed in relation to FIG. 2 except that driver circuit 40 and controllable current source CS are replaced with a driver circuit 70 and a current driver circuit 82 respectively. Driver circuit 70 may particularly comprise electronic components such as MOS transistors. According to an embodiment, driver circuit 70 comprises two storage circuits 72 and 74 configured to store, for each image pixel color component, the bits of the digital color signal representative of the image pixel color component to be displayed based on received data Data. The first storage circuit 72 (Shift register for lower bits (PWM)) is a shift register in which are stored a number LB of bits of the digital color signal for which a pulse-width modulation is implemented. The second storage circuit 74 (Shift register for higher bits (PAM)) is a shift register in which are stored a number HB of bits of the digital color signal for which a pulse-amplitude modulation is implemented. According to an embodiment, for each image pixel color component, the digital color signal comprises NB bits, among which LB bits, starting from the low significant bit (LSB), that are stored in the first storage circuit 72 and that are used for the pulse-width modulation, and HB bits, starting from the MSB, that are stored in the second storage circuit 74 and that are used for the pulse-amplitude modulation.

Driver circuit 70 further comprises a first shift circuit 76 (Switch circuit) receiving successive bits of data Data, a writing clock signal Clk_wr, and signal PWM, and providing the bits of data Data, and either writing clock signal Clk_wr or signal PWM to the first storage circuit 72. First shift circuit 76 is controlled by a binary signal Line. Driver circuit 70 further comprises a second shift circuit 78 (Switch circuit) receiving writing clock signal Clk_wr and bits of data from the first storage circuit 72 and providing writing clock signal Clk_wr and the bits of data to the second storage circuit 74. Second shift circuit 78 is controlled by binary signal Line.

Driver circuit 70 further comprises a logic circuit 80 (AND gate (HB+1)) receiving a binary signal CPWM from the first storage circuit 72 and a digital signal CPAM from the second storage circuit 74, digital signal CPAM having the number HB of bits. Logic circuit 80 is controlled by a binary signal Ctrl.

Current driver circuit 82 supplies current I_LED to light-emitting circuit LEDS. Logic circuit 80 is configured to provide a binary signal CPWM' and a digital signal CPAM' to current driver circuit 82. Upon the control of signal Ctrl, binary signal CPWM' can be equal to binary signal CPWM and digital signal CPAM' can be equal to digital signal CPAM. Current driver circuit 82 may comprise a digital-to-analog converter (DAC).

Figure 8:
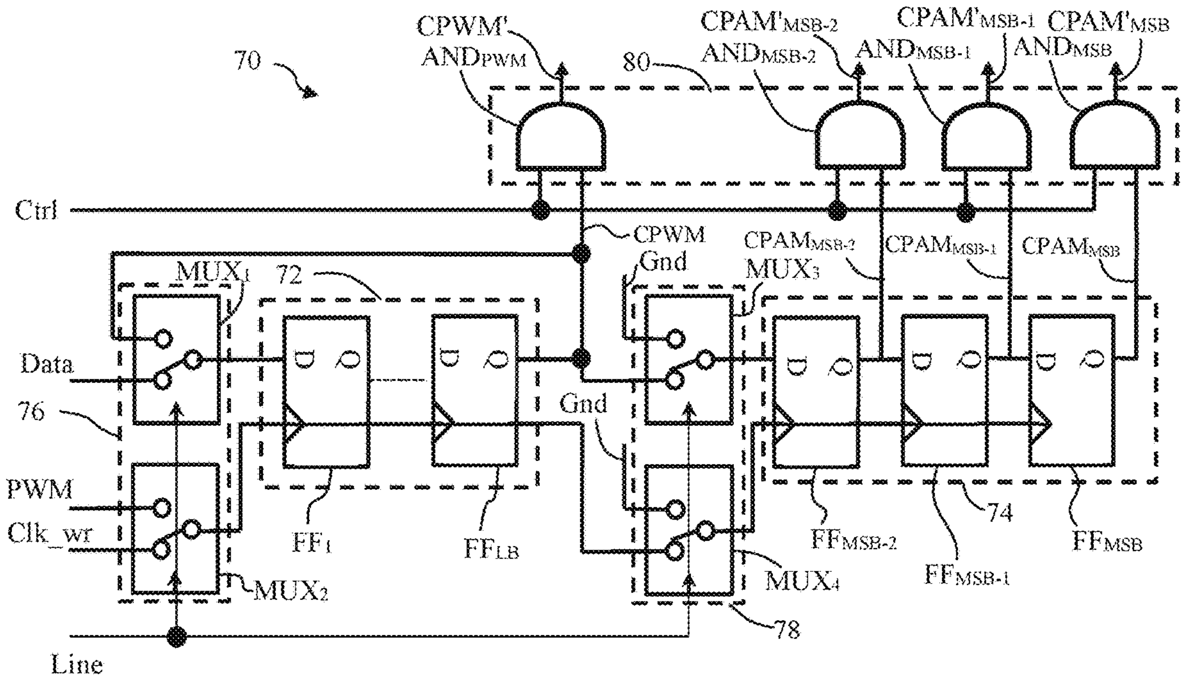
FIG. 8 shows a more detailed embodiment of elements of the display pixel of FIG. 7.

FIG. 8 shows a more detailed embodiment of driver circuit 70 of FIG. 7 in case HB is equal to three as an example.

The first storage circuit 72 comprises successive D flip-flops $FF_1$ to $FF_{LB}$. The number of D flip-flops $FF_1$ to $FF_{LB}$ is equal to LB. The Q output of flip-flop $FF_{LB}$ provides signal CPWM. The second storage circuit 74 comprises HB successive flip-flops, three flip-flops $FF_{MSB-2}$, $FF_{MSB-1}$, and $FF_{MSB}$ being shown as an example in FIG. 8. The Q output of flip-flop $FF_{MSB-2}$ provides binary signal $CPAM_{MSB-2}$. The Q output of flip-flop $FF_{MSB-1}$ provides binary signal $CPAM_{MSB-1}$. The Q output of flip-flop $FF_{MSB}$ provides binary signal $CPAM_{MSB}$. Binary signals $CPAM_{MSB-2}$, $CPAM_{MSB-1}$, and $CPAM_{MSB}$ forms digital signal CPAM shown in FIG. 7.

The first shift circuit 76 comprises a first 2-to-1 multiplexer $MUX_1$ and a second 2-to-1 multiplexer $MUX_2$ and the second shift circuit 78 a third 2-to-1 multiplexer $MUX_3$ and a fourth 2-to-1 multiplexer $MUX_4$. Each of the first multiplexer $MUX_1$, the second multiplexer $MUX_2$, the third multiplexer $MUX_3$, and the fourth multiplexer $MUX_4$ is controlled by signal Line and comprises a first input, a second input, and an output that is connected to the first input when signal Line is at a first value, for example "0", and that is connected to the second input when signal Line is at a second value, for example "1".

The first input of first multiplexer $MUX_1$ is connected to the Q output of flip-flop $FF_{LB}$ of the first storage circuit 72. The second input of first multiplexer $MUX_1$ receives signal Data and the output of first multiplexer $MUX_1$ is connected to the D input of flip-flop $FF_1$ of the first storage circuit 72. The first input of the second multiplexer $MUX_2$ receives signal PWM. The second input of the second multiplexer $MUX_2$ receives the writing clock signal Clk_wr, and the output of the second multiplexer $MUX_2$ is connected to the clock input of each flip-flop $FF_1$ to $FF_{LB}$ of the first storage circuit 72.

The first input of the third multiplexer $MUX_3$ receives reference potential Gnd. The second input of the third multiplexer $MUX_3$ is connected to the Q output of flip-flop $FF_{LB}$ of the first storage circuit 72, and the output of the third multiplexer $MUX_3$ is connected to the D input of flip-flop $FF_{MSB\text{-}2}$ of the second storage circuit 74. The first input of the fourth multiplexer $MUX_4$ receives reference potential Gnd. The second input of the fourth multiplexer $MUX_4$ receives the writing clock signal Clk_wr, and the output of the fourth multiplexer $MUX_4$ is connected to the clock input of each flip-flop $FF_{MSB\text{-}2}$, $FF_{MSB\text{-}1}$, and $FF_{MSB}$ of the second storage circuit 74.

Logic circuit 80 comprises HB+1 logic gates of the AND type $AND_{PWM}$, $AND_{MSB\text{-}2}$, $AND_{MSB\text{-}1}$, and $AND_{MSB}$. Each gate $AND_{PWM}$, $AND_{MSB\text{-}2}$, $AND_{MSB\text{-}1}$, and $AND_{MSB}$ has a first input receiving signal Ctrl. The second input of gate $AND_{PWM}$ is connected to the Q output of flip-flop $FF_{LB}$ of the first storage circuit 72. The second input of gate $AND_{MSB\text{-}2}$, $AND_{MSB\text{-}1}$, and $AND_{MSB}$ is connected to the Q output of flip-flop $FF_{MSB\text{-}2}$, $FF_{MSB\text{-}1}$, and $FF_{MSB}$ respectively of the second storage circuit 74.

Figure 9:
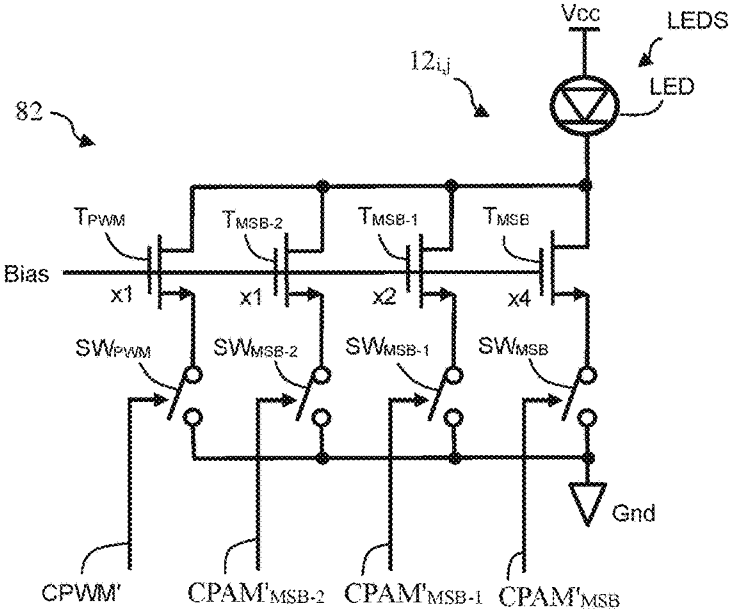
FIG. 9 shows a more detailed embodiment of other elements of the display pixel of FIG. 7.

FIG. 9 shows a more detailed embodiment of current driver circuit 82 of FIG. 7 in case HB is equal to three as an example. Light-emitting circuit LEDS is shown in FIG. 9 by a single light-emitting diode LED. However, light-emitting circuit LEDS can comprise several light-emitting diodes LED connected in parallel.

Current driver circuit 82 comprises HB+1 MOS transistors, for example of N type, among which one transistor $T_{PWM}$ used for the pulse-width modulation and HB transistors $T_{MSB\text{-}2}$, $T_{MSB\text{-}1}$, and $T_{MSB}$ used for the pulse-amplitude modulation. The drain of each transistor $T_{PWM}$, $T_{MSB\text{-}2}$, $T_{MSB\text{-}1}$, and $T_{MSB}$ is connected to the cathode of light-emitting diode LED. The anode of light-emitting diode LED receives high reference potential Vcc. The gate of each transistor $T_{PWM}$, $T_{MSB\text{-}2}$, $T_{MSB\text{-}1}$, and $T_{MSB}$ receives signal Bias. The width of transistor $T_{MSB\text{-}2}$ is equal to the width of transistor $T_{PWM}$. The width of transistor $T_{MSB\text{-}1}$ is equal to twice the width of transistor $T_{MSB\text{-}2}$. The width of transistor $T_{MSB}$ is equal to four times the width of transistor $T_{MSB\text{-}2}$.

Current driver circuit 82 comprises HB+1 switches, among which one switch $SW_{PWM}$ used for the pulse-width modulation and HB switches $SW_{MSB\text{-}2}$, $SW_{MSB\text{-}1}$, and $SW_{MSB}$ used for the pulse-amplitude modulation. A first terminal of each switch $SW_{PWM}$, $SW_{MSB\text{-}2}$, $SW_{MSB\text{-}1}$, and $SW_{MSB}$ receives low reference potential Gnd. The second terminal of switch $SW_{PWM}$ is connected to the source of transistor $T_{PWM}$. The second terminal of each switch $SW_{MSB\text{-}2}$, $SW_{MSB\text{-}1}$, and $SW_{MSB}$ is connected to the source of transistor $T_{MSB\text{-}2}$, $T_{MSB\text{-}1}$, and $T_{MSB}$ respectively. Switch $SW_{PWM}$ is controlled by binary signal CPWM'. Switch $SW_{MSB\text{-}2}$, $SW_{MSB\text{-}1}$, and $SW_{MSB}$ is controlled by binary signal $CPAM'_{MSB\text{-}2}$, $CPAM'_{MSB\text{-}1}$, and $CPAM'_{MSB}$ respectively.

Figure 10:
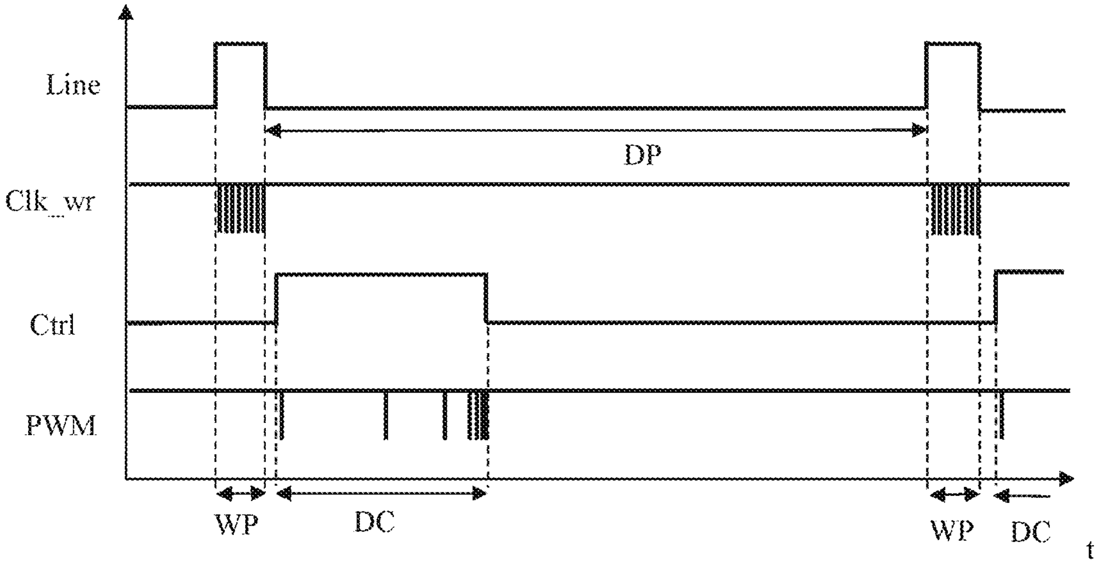
FIG. 10 shows timing diagrams of signals during an embodiment of a method for controlling the display pixel of FIG. 7.

FIG. 10 shows examples of timing diagrams of signals Line, Clk_wr, Ctrl, and PWM during the operation of the display pixel having the structure shown in FIGS. 8 and 9.

Signal Line is put at logical level "1" in writing phases WP in order to perform a writing operation in first storage circuit 72 and in second storage circuit 74. More precisely, when signal Line is at logical level "1", multiplexer $MUX_1$ provides at its output signal Data, multiplexer $MUX_2$ provides at its output clock signal Clk_wr, multiplexer $MUX_3$ provides at its output the signal provided by the Q output of flip-flop $FF_{LB}$, and multiplexer $MUX_4$ provides at its output clock signal Clk_wr. Successive bits of data Data are stored in the first storage circuit 72 and the second storage circuit 74 clocked by clock signal Clk_wr. According to an embodiment, the bits of data Data are successively provided, from the MSB to the LSB of the digital color signal, to the first flip-flop $FF_1$ of the storage circuit 72. The bits shift, at the cadence of clock signal clk_wr, through the first storage circuit 72, and eventually through the second storage circuit 74. In particular, the MSB of the digital color signal shifts from flip-flop $FF_1$ to flip-flop $FLL_{LB}$ of the first storage circuit 72 and then from flip-flop $FF_{MSB\text{-}2}$ to flip-flop $FF_{MSB}$ of the second storage circuit 74. When the MSB of the digital color signal has reached flip-flop $FF_{MSB}$, LSB of the digital color signal has reached flip-flop $FF_1$.

Signal Line is put at logical level "0" in a display phase DP between two successive writing phase WP. During a display phase DP, signal Ctrl is put at logical level "1" in at least one display cycle DC for the display of the image pixel color component by the light-emitting diode LED. When signal Line is at logical level "0", multiplexer $MUX_1$ provides at its output the Q output of flip-flop $FF_{LB}$, multiplexer $MUX_2$ provides at its output signal PWM, multiplexer $MUX_3$ provides at its output low reference potential Gnd, and multiplexer $MUX_4$ provides at its output low reference potential Gnd. Moreover, since signal Ctrl is at logical level "1", each gate $AND_{PWM}$, $AND_{MSB\text{-}2}$, $AND_{MSB\text{-}1}$, and $AND_{MSB}$ provides at its output the bit present at its second input. Therefore, gate $AND_{PWM}$ provides at its output the bit present at the output of flip-flop $FF_{LB}$, and each gate $AND_{MSB\text{-}2}$, $AND_{MSB\text{-}1}$, and $AND_{MSB}$ provides at its output the MSB-2, MSB-1, and MSB respectively of the color signal data. Flip-flops $FF_1$ to $FF_{LB}$ of the first storage circuit 72 are clocked by signal PWM, and the bits of digital color signal stored in the first storage circuit 72 are shifted from one flip-flop to the next flip-flop at each pulse of signal PWM, so that the bit present at the output of flip-flop $FF_{LB}$ corresponds successively to the LB bits of the color data signal, the last bit being provided being the LSB of the color data signal.

Figure 11:
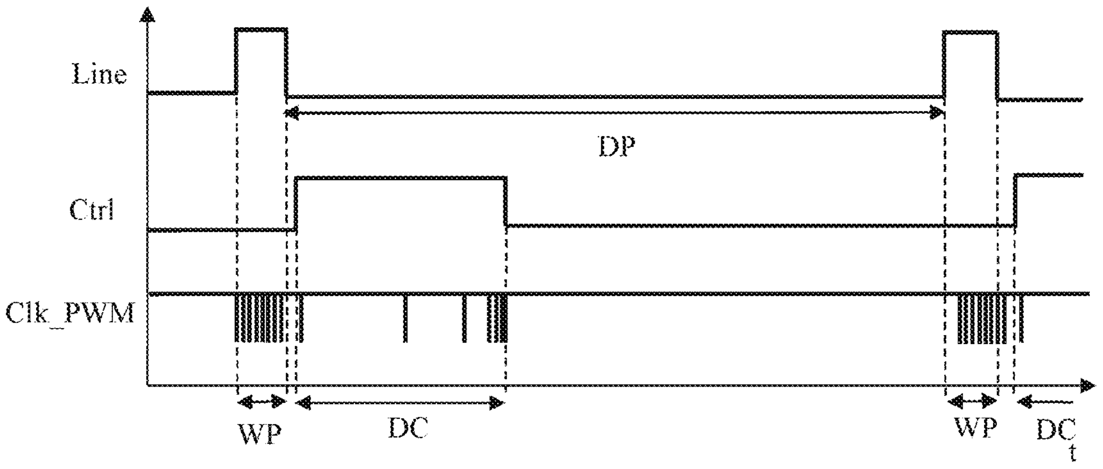
FIG. 11 shows timing diagrams of signals during another embodiment of a method for controlling the display pixel of FIG. 7.

FIG. 11 shows another embodiment in which signal PWM and signal Clk_wr are fused into a single binary signal Clk_PWM. According to this variation, multiplexer $MUX_2$ may not by present.

In the timing diagrams shown in FIGS. 10 and 11, there is only one display cycle DC during the display phase DP between two successive writing phases WP. Alternatively, a display phase DP between two successive writing phases WP can comprise more than one display cycle DC.

Figure 12:
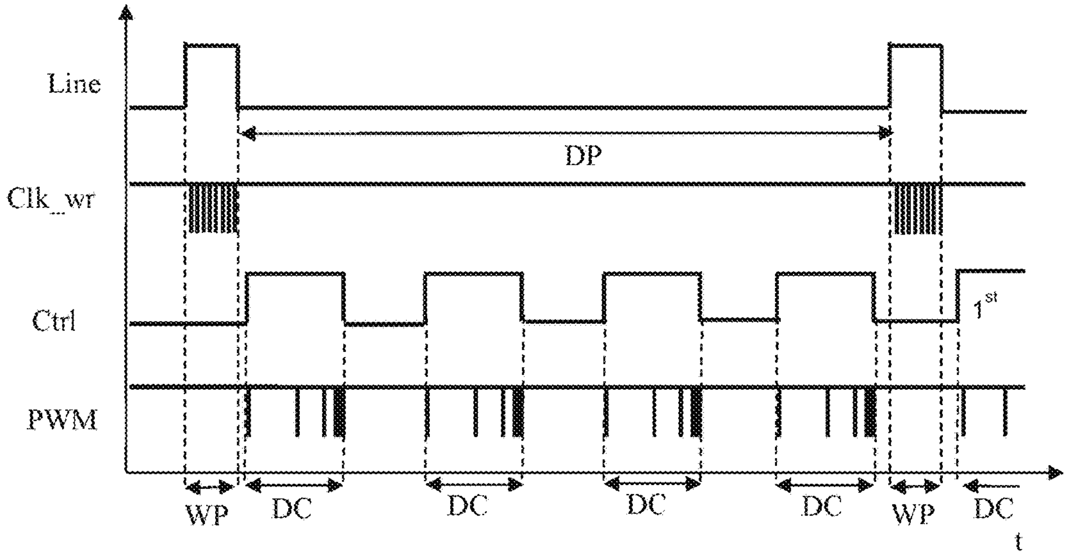
FIG. 12 shows timing diagrams of signals during another embodiment of a method for controlling the display pixel of FIG. 7.

FIG. 12 is similar to FIG. 10 and shows examples of timing diagrams of signals Line, Clk_wr, Ctrl, and PWM during the operation of the display pixel having the structure shown in FIGS. 8 and 9. In FIG. 12, each display phase DP between two successive writing phases WP comprises the repetition of four identical display cycles DC.

Figure 13:
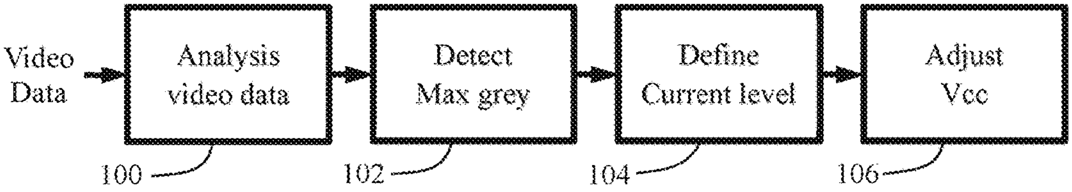
FIG. 13 is a block diagram illustrating an embodiment of a method for modifying the supply power of a display screen.

FIG. 13 is a block diagram illustrating an embodiment of a method for modifying the supply power Vcc of display screen 10. The method comprises the following steps:

- the video data to be displayed are received by circuit 26 of display screen 10 (step 100);
- the maximum grey level of the image to be displayed is determined (step 102). To simplify the computing of the grey level of the image, for each image pixel color component of each image pixel, only the bits of the digital color signal used for the pulse-amplitude modulation are taken into account;

the current intensity necessary for the display of the image is determined based on the maximum grey level of the image (step 104); and the supply voltage Vcc is adjusted (step 106) so that the desired current intensity can be supplied to the light-emitting diodes of the display pixels when displaying the image.

The level of the supply voltage Vcc can be reduced for an image having dark tones since, in that case, only a current of low intensity is required to display the image. The level of the supply voltage Vcc can be increased for an image having light tones since, in that case, a current of high intensity is required to display the image. Therefore, this embodiment allows to reduce the electrical power consumed by the display screen.

Figure 14:
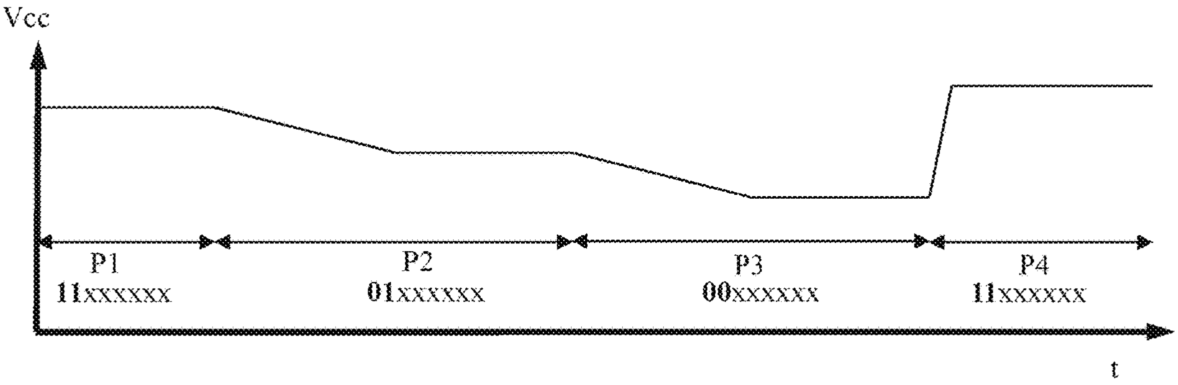
FIG. 14 shows a time diagram of the power supply of a display screen during the display of video data.

FIG. 14 shows an example of evolution of the power supply Vcc during the display of video data. In this example, the bits used for the pulse-amplitude modulation are the MSB and the MSB-1 of the color data signals. As an example, FIG. 14 shows four successive phases P1, P2, P3, and P4 with different maximum grey levels. In phases P1 and P4, the maximum grey level corresponds to the MSB and the MSB-1 that are at the logical state "1". In phase P2, the maximum grey level corresponds to the MSB that is at the logical state "0" and the MSB-1 that is at the logical state "1". In phase P3, the maximum grey level corresponds to the MSB and the MSB-1 that are at the logical state "0". As can be seen in FIG. 14, in each phase P1, P2, P3, and P4, potential Vcc is adjusted to a constant level. The variation of potential Vcc from a constant level to another constant level may be implemented with a given variation rate in order to prevent sudden changes on the display images.

In some cases, the wavelength of the radiation emitted by a light-emitting diode may vary according to the intensity of the current crossing through the light-emitting diode. This may not be desirable.

Figure 15:
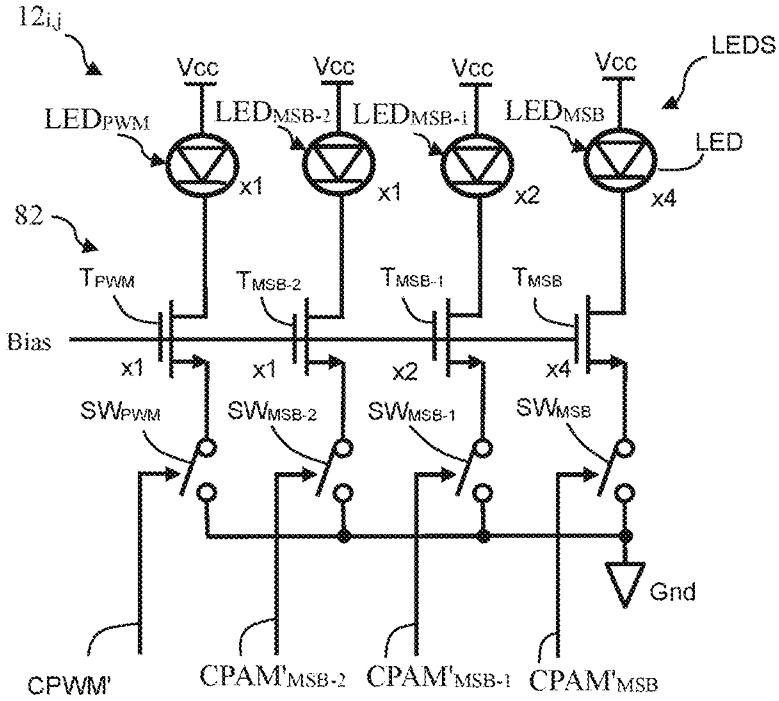
FIG. 15 is a figure similar to FIG. 9 and shows another embodiment of elements of the display pixel of FIG. 7.

FIG. 15 is a figure similar to FIG. 9 and shows another embodiment of the display pixel $\mathbf{12}_{i,j}$. The display pixel $\mathbf{12}_{i,j}$ shown in FIG. 15 comprises all the elements of the display pixel $\mathbf{12}_{i,j}$ shown in FIG. 9 except that it comprises a light-emitting circuit LEDS comprising several light-emitting diodes LED for each image pixel color component, only the light-emitting diodes LED of one image pixel color component being shown in FIG. 15. This embodiment can advantageously be easily implemented when each light-emitting diode comprises a nanometer or micrometer three-dimensional element, for example a microwire, a nanowire, or nanometer or micrometer three-dimensional element having a pyramidal, conical, or frustoconical shape, the nanometer or micrometer three-dimensional element being covered by the active region of the light-emitting diode, that is the region from which most of the electromagnetic radiation supplied by the light-emitting diode is emitted.

For each image pixel color component, the light-emitting diodes LED of the light-emitting circuit LEDS are dispatched in HB+1 groups $LED_{PWM}$, $LED_{MSB\text{-}2}$, $LED_{MSB\text{-}1}$, and $LED_{MSB}$ of light-emitting diodes, HB being equal to 3 as an example in FIG. 9 and each group of light-emitting diodes $LED_{PWM}$, $LED_{MSB\text{-}2}$, $LED_{MSB\text{-}1}$, and $LED_{MSB}$ being shown by the electric symbol of a single light-emitting diode LED in FIG. 15. The anode of each light-emitting diode of each group of light-emitting diodes $LED_{PWM}$, $LED_{MSB\text{-}2}$, $LED_{MSB\text{-}1}$, and $LED_{MSB}$ receives high reference potential Vcc. The cathode of each light-emitting diode of group $LED_{PWM}$ is connected to the drain of transistor $T_{PWM}$. The cathode of each light-emitting diode of group $LED_{MSB\text{-}2}$ is connected to the drain of transistor $T_{MSB\text{-}2}$. The cathode of each light-emitting diode of group $LED_{MSB\text{-}1}$ is connected to the drain of transistor $T_{MSB\text{-}1}$. The cathode of each light-emitting diode of group $LED_{MSB}$ is connected to the drain of transistor $T_{MSB}$. The number of light-emitting diodes in each group $LED_{PWM}$, $LED_{MSB\text{-}2}$, $LED_{MSB\text{-}1}$, and $LED_{MSB}$ is chosen so that, when switched on, the light intensity emitted by group $LED_{MSB\text{-}2}$ is equal to the light intensity emitted by group $LED_{PWM}$, the light intensity emitted by group $LED_{MSB\text{-}1}$ is equal to twice the light intensity emitted by group $LED_{MSB\text{-}2}$, and the light intensity emitted by group $LED_{MSB}$ is equal to twice the light intensity emitted by group $LED_{MSB\text{-}1}$. Therefore, the current density for each light-emitting diode of each group $LED_{PWM}$, $LED_{MSB\text{-}2}$, $LED_{MSB\text{-}1}$, and $LED_{MSB}$ is advantageously the same. In case the light-emitting diodes have all the same structure, the number of light-emitting diodes of group $LED_{MSB\text{-}2}$ is equal to the number of light-emitting diodes of group $LED_{PWM}$, the number of light-emitting diodes of group $LED_{MSB\text{-}1}$ is equal to twice the number of light-emitting diodes of group $LED_{MSB\text{-}2}$, and the number of light-emitting diodes of group $LED_{MSB}$ is equal to twice the number of light-emitting diodes of group $LED_{MSB\text{-}1}$. Therefore, the current density for each light-emitting diode of each group $LED_{PWM}$, $LED_{MSB\text{-}2}$, $LED_{MSB\text{-}1}$, and $LED_{MSB}$ is advantageously the same.

Figure 16:
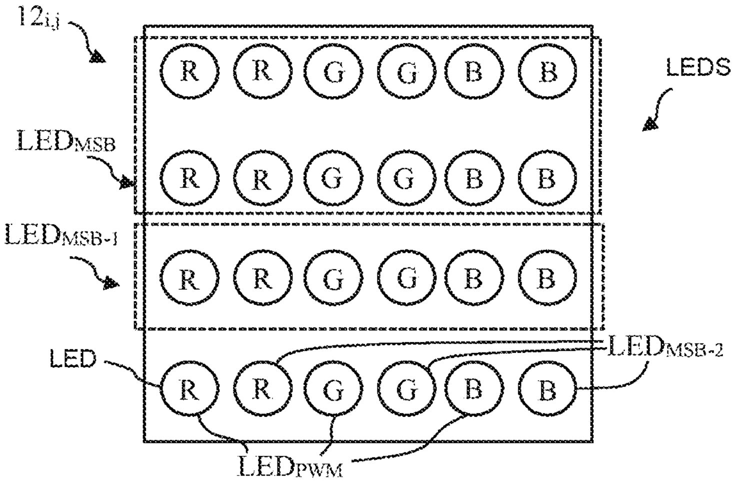
FIG. 16 is a top view of the display pixel shown in FIG. 15.

FIG. 16 is a top view of an embodiment of display pixel 12*i,j* shown in FIG. 15 showing an arrangement of the light-emitting diodes of the light-emitting circuit LEDS. Each light-emitting diode LED is shown by a circle in which is indicated the letter "R" for the light-emitting diodes emitting a red radiation, the letter "G" for the light-emitting diodes emitting a green radiation, and the letter "B" for the light-emitting diodes emitting a blue radiation. In FIG. 16, group $LED_{MSB}$ comprises four light-emitting diodes for each image pixel color component, group $LED_{MSB\text{-}1}$ comprises two light-emitting diodes for each image pixel color component, group $LED_{MSB\text{-}2}$ comprises one light-emitting diode for each image pixel color component and group $LED_{PWM}$ comprises one light-emitting diode for each image pixel color component.

It may be desirable that the storage capacity of digital signals of the display pixel $\mathbf{12}_{i,j}$ to be reduced.

Figure 17:
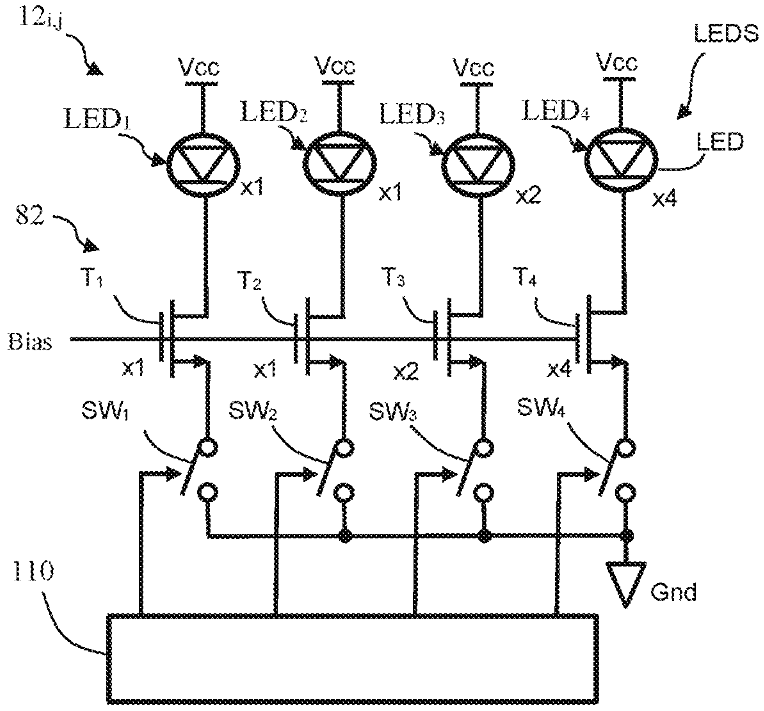
FIG. 17 shows another embodiment of a display pixel.

FIG. 17 is a figure similar to FIG. 15 and shows another embodiment of the display pixel $\mathbf{12}_{i,j}$. The display pixel $\mathbf{12}_{i,j}$ shown in FIG. 17 comprises all the elements of the display pixel $\mathbf{12}_{i,j}$ shown in FIG. 15 except that, for light-emitting circuit LEDS, group $LED_{PWM}$ is labelled $LED_1$, group $LED_{MSB\text{-}2}$ is labelled $LED_2$, group $LED_{MSB\text{-}1}$ is labelled $LED_3$, group $LED_{MSB}$ is labelled $LED_4$, transistor $T_{PWM}$ is labelled $T_1$, transistor $T_{MSB\text{-}2}$ is labelled $T_2$, transistor $T_{MSB\text{-}1}$ is labelled $T_3$, transistor $T_{MSB}$ is labelled $T_1$, switch $SW_{PWM}$ is labelled $SW_1$, switch $SW_{MSB\text{-}2}$ is labelled $SW_2$, switch $SW_{MSB\text{-}1}$ is labelled $SW_3$, switch $SW_{MSB}$ is labelled $SW_4$, and except the gates of transistors $T_1$, $T_2$, $T_3$, $T_4$ are controlled by control circuit 110.

Figure 18:
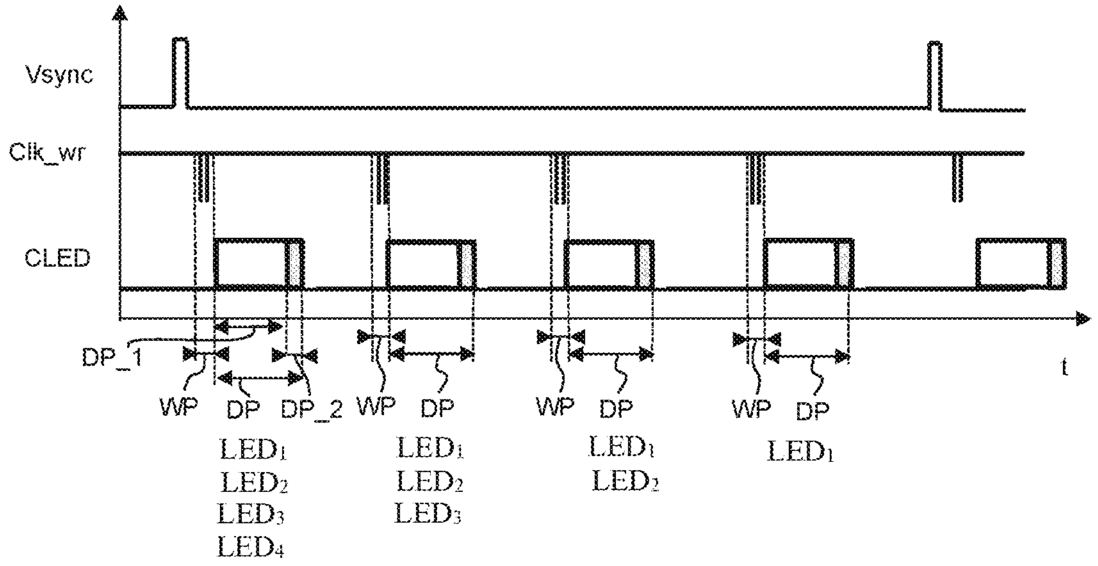
FIG. 18 shows time diagrams of signals during the operation of the display pixel of FIG. 17.

FIG. 18 shows time diagrams of signals Vsync and Clk_wr, and control signals CLED of light-emitting diodes for an embodiment of a display screen comprising the display pixels $\mathbf{12}_{i,j}$ shown in FIG. 17. In this embodiment, for the display of a color image pixel color component, the bits of the digital color signal are sent to each display pixel in successive writing phases WP separated by display phases DP. Four writing phases WP and four display phases DP are shown as an example in FIG. 18 for the display of an image pixel and 2 bits of the digital color signal are stored in the display pixel during each writing phase WP, the digital color signal comprising 8 bits.

Each display phase DP is divided into a first sub-phase DP_1 and a second sub-phase DP_2. The total duration of the display phase DP, the duration of the first sub-phase DP_1, and the duration of the second sub-phase DP_2 are the same for all the display phases DP. The duration of the first sub-phase DP_1 is equal to a multiple of the duration of the second sub-phase DP_2. In the present example, the duration of the first sub-phase DP_1 is equal to sixteen times the duration of the second sub-phase DP_2. For each display phase DP, the light-emitting diodes of different groups among groups $LED_1$, $LED_2$, $LED_3$, and $LED_4$ are switched on or off based on a first stored bit of the digital color signal during the first sub-phase DP_1 and based on a second stored bit of the digital color signal during the second sub-phase DP_2.

In FIG. 18, the groups $LED_1$, $LED_2$, $LED_3$, and $LED_4$ of light-emitting diodes that can be used during a display phase DP are indicated under the display phase DP. In the present embodiment, the light-emitting diodes of group $LED_1$ are used in the first and second sub-phase DP_1 and DP_2 of all the display phases DP. The light-emitting diodes of group $LED_2$ are used in the first and second sub-phase DP_1 and DP_2 of three of the display phases DP, and are systematically switched off in the other display phase DP. The light-emitting diodes of group $LED_3$ are used in the first and second sub-phase DP_1 and DP_2 of two of the display phases DP and are systematically switched off in the other display phases DP. The light-emitting diodes of group $LED_4$ are used in the first and second sub-phase DP_1 and DP_2 of one of the display phases DP, and are systematically switched off in the other display phase DP. The four successive display phases are equivalent to a single display phase for which the light-emitting diodes would be controlled by pulse-width modulation and pulse-amplitude modulation.

Figure 19:
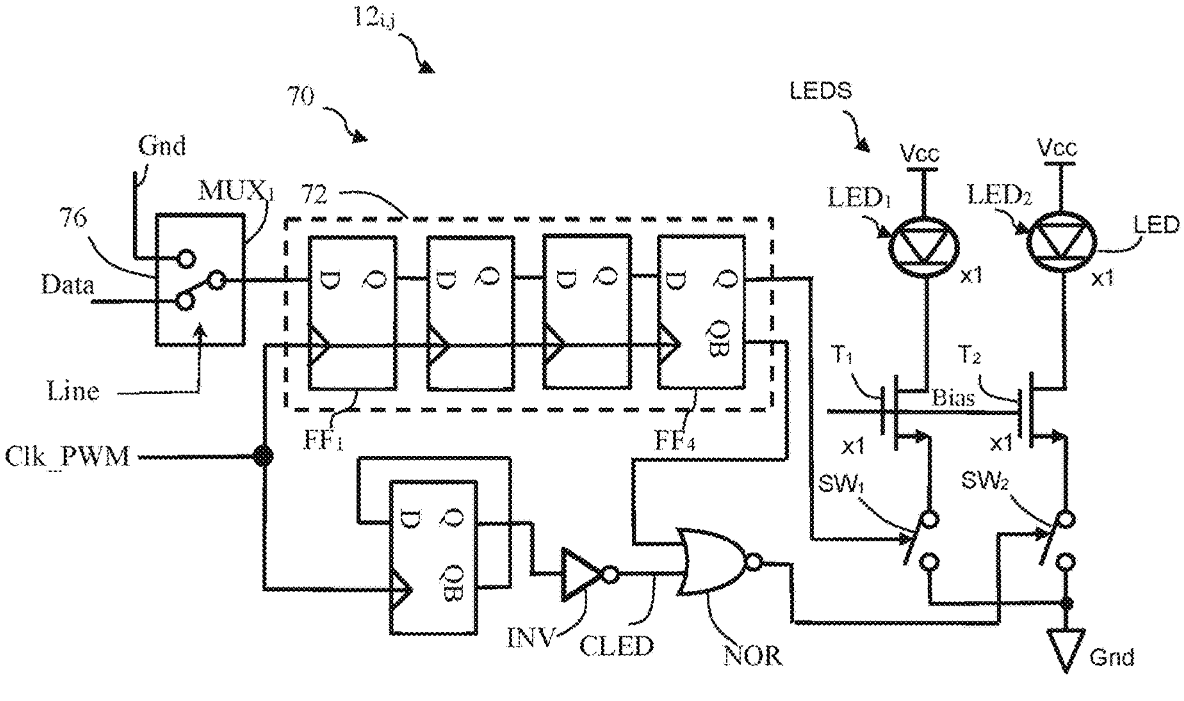
FIG. 19 shows another embodiment of a display pixel.

FIG. 19 shows another embodiment of a display pixel $12_{i,j}$. Display pixel $12_{i,j}$ shown in FIG. 19 comprises all the elements of display pixel $12_{i,j}$ shown in FIG. 8 except that second storage circuit 74, second shift circuit 78, and logic circuit 80 are not present. Moreover, display pixel $12_{i,j}$ comprises the light-emitting circuit LEDS shown in FIG. 17 with two groups $LED_1$ and $LED_2$ of light-emitting diodes. The number of flip-flops of first storage circuit 72 is equal to 4 as an example in FIG. 19. Flip-flops $FF_1$ to $FF_4$ are clocked by binary signal Clk_PWM. Moreover, first shift circuit 76 comprises only first multiplexer $Mux_1$. The first input of first multiplexer $MUX_1$ receives low reference potential Gnd. The second input of first multiplexer $MUX_1$ receives signal Data and the output of first multiplexer $MUX_1$ is connected to the D input of flip-flop $FF_1$ of the first storage circuit 72.

Driver circuit 70 further comprises an additional D flip-flop $FF_{c1}$ that is clocked by binary signal Clk_PWM. The D input of flip-flop $FF_{c1}$ is connected to the QB output of flip-flop $FF_{c1}$. Driver circuit 70 further comprises an inverter INV and a logic gate NOR of the NOR type. The input of inverter INV is connected to the Q output of flip-flop $FF_{c1}$. Inverter INV provides binary signal CLED. The QB output of flip-flop $FF_4$ is connected to a first input of gate NOR. The output of inverter INV is connected to a second input of gate NOR. In the present embodiment, display pixel $12_{i,j}$ comprises only groups $LED_1$ and $LED_2$ of light-emitting diodes.

Figure 20:
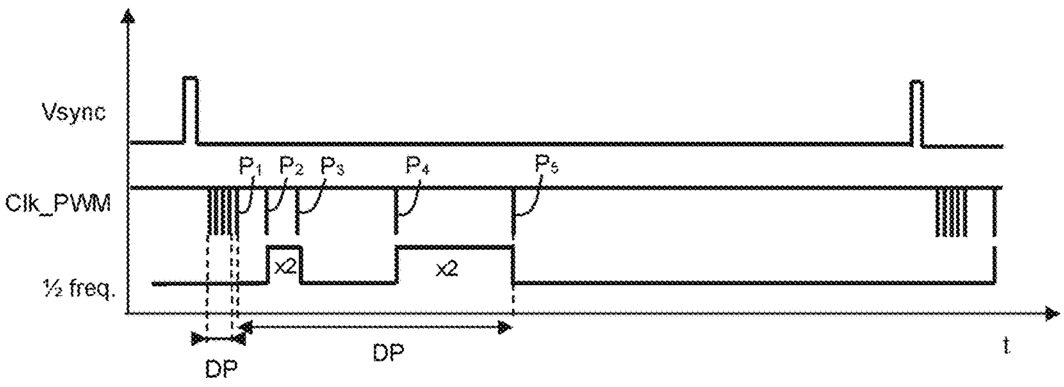
FIG. 20 shows time diagrams of signals during the operation of the display pixel of FIG. 19.

FIG. 20 shows time diagrams of signals Vsync and Clk_PWM, and signal CLED for an embodiment of a display screen comprising the display pixels $12_{i,j}$ shown in FIG. 18. Binary signal Clk_PWM includes writing clock Clk_wr and signal PWM. In this embodiment, the bits of the digital color signal are sent to the first storage circuit 72 of display pixel $12_{i,j}$ in a writing phase WP. During a display phase DP that follows writing phase WP, signal Clk_PWM comprises first, second, third, fourth, and fifth successive pulses $P_1$, $P_2$, $P_3$, $P_4$, and $P_5$. First pulse $P_1$ indicates the start of the display phase DP and fifth pulse $P_5$ indicates the end of the display phase DP. Storage circuit 72 is clocked by the successive pulses $P_1$, $P_2$, $P_3$, $P_4$ to provide successively at the Q output of flip-flop $FF_4$ the bits stored in storage circuit 72.

The duration between first pulse $P_1$ and second pulse $P_2$ is equal to the duration between second pulse $P_2$ and third pulse $P_3$. The duration between third pulse $P_3$ and fourth pulse $P_4$ is equal to the duration between fourth pulse $P_4$ and fifth pulse $P_5$ and is equal to four times the duration between first pulse $P_1$ and second pulse $P_2$. Signal CLED provided by inverter INV alternates between logical states "0" and "1" at each pulse of signal Clk_PWM so that CLED is at logical state "0" between first pulse $P_1$ and second pulse $P_2$ and between third pulse $P_3$ and fourth pulse $P_4$ and signal CLED is at logical state "1" between second pulse $P_2$ and third pulse $P_3$ and between fourth pulse $P_4$ and fifth pulse $P_5$.

In FIG. 20, the group $LED_1$ of light-emitting diodes that can be used during the whole display phase DP whereas the group $LED_2$ of light-emitting diodes that can be used only between second pulse $P_2$ and third pulse $P_3$ and between fourth pulse $P_4$ and fifth pulse $P_5$. Therefore, between first pulse $P_1$ and second pulse $P_2$ and between third pulse $P_3$ and fourth pulse $P_4$, only the light-emitting diodes of group $LED_1$ are switched on or switched off based on the bit provided by flip-flip $FF_4$ and between second pulse $P_2$ and third pulse $P_3$ and between fourth pulse $P_4$ and fifth pulse $P_5$, light-emitting diodes of both groups $LED_1$ and $LED_2$ are switched on or switched on based on the bit provided by flip-flip $FF_4$. Therefore, the current density for each light-emitting diode of each group $LED_1$ and $LED_2$ is advantageously the same.

Figure 21:
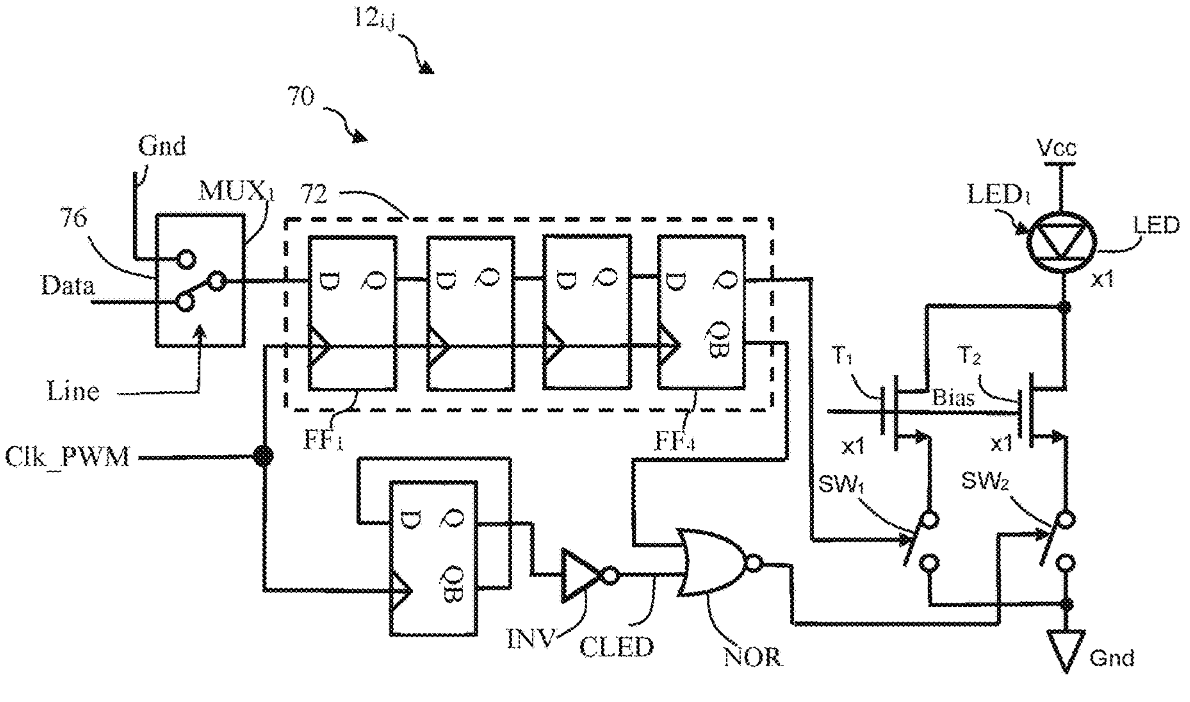
FIG. 21 shows another embodiment of a display pixel.

FIG. 21 shows another embodiment of a display pixel $12_{i,j}$. Display pixel $12_{i,j}$ shown in FIG. 21 comprises all the elements of display pixel $12_{i,j}$ shown in FIG. 18 except that it comprises, for each image pixel color component, only one group $LED_1$ of light-emitting diodes, the cathode of the light-emitting diodes of group $LED_1$ being connected to the drain of transistor $T_1$ and to the drain of transistor $T_2$. The operation of display pixel $12_{i,j}$ shown in FIG. 21 is the same as the operation of display pixel $12_{i,j}$ shown in FIG. 19.

As will be described hereafter, to limit the number of conductive pads Gnd, P_Vcc, P_Col, P_Row per display pixel $12_{i,j}$, data signals $Data_j$ enable both the determination, by each display pixel $12_{i,j}$, of a clock signal and of the color signals R, G, B representative of the light intensities desired for the radiations at the first, second, and third wavelengths. As a variation, data signals $Data_j$ can be used only to the determination, by each display pixel $12_{i,j}$, of the color signals R, G, B and the clock signal is received by each pixel $12_{i,j}$, on a separate conductive pad.

According to an embodiment of the display screen 10 shown in FIG. 1, for each row, the display pixels $12_{i,j}$ in the row are coupled to a single row electrode $18_i$. For each column, the display pixels $12_{i,j}$ in the column are coupled to a single column electrode $20_j$. Display screen 10 comprises a selection circuit 22 coupled to row electrodes $18_i$ and adapted to delivering a selection and timing signal $Com_i$ on each row electrode $18_i$. Display screen 10 comprises a data delivery circuit 24 coupled to column electrodes $20_j$ and adapted to delivering a data signal $Data_j$ on each column electrode $20_j$. Selection circuit 22 and control circuit 24 are controlled by a circuit 26, for example comprising a microprocessor.

Figure 22:
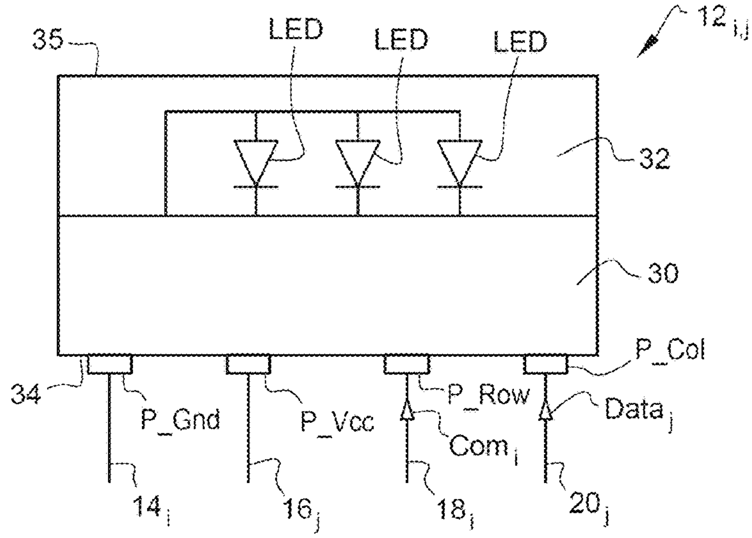
FIG. 22 is a very simplified cross-section view of an example of a display pixel.
Figure 23:
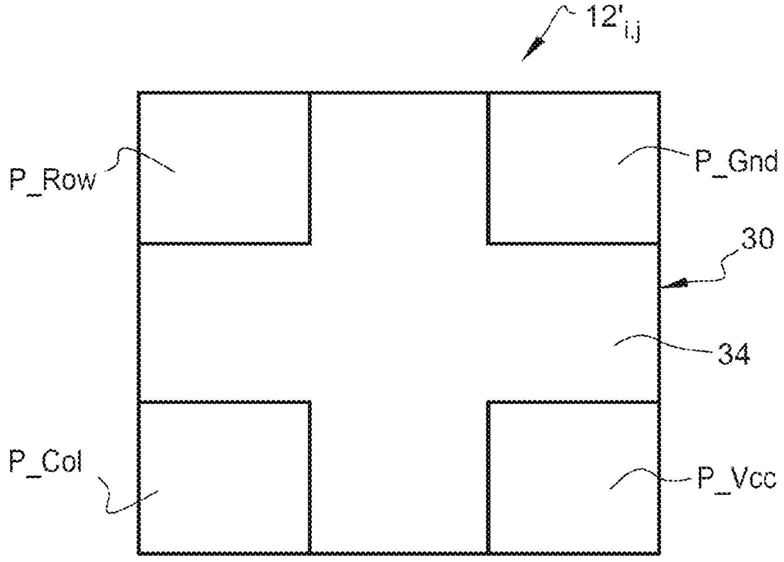
FIG. 23 is a bottom view of the display pixel of FIG. 22.

FIG. 22 is a very simplified cross-section view of a known example of display pixel $12_{i,j}$ and FIG. 23 is a bottom view of display pixel $12_{i,j}$. Each display pixel $12_{i,j}$ comprises a control circuit 30 covered with a display circuit 32. Display circuit 32 comprises at least one light-emitting diode LED, preferably at least three light-emitting diodes LED. The display pixel comprises a lower surface 34 and an upper surface 35 opposite to lower surface 34, surfaces 34 and 35 being preferably planar and parallel. Control circuit 30 further comprises conductive pads P_Gnd, P_Vcc, P_Col, P_Row on lower surface 34. Control circuit 30 may correspond to an integrated circuit comprising electronic components, particularly insulated gate field effect transistors, also called MOS transistors, or thin film transistors, also called TFTs. Preferably, display circuit 32 only comprises light-emitting diodes LED and the conductive elements of these light-emitting diodes LED, and control circuit 30 comprises all the electronic components necessary to the control of the light-emitting diodes LED of display circuit 32. As a variant, display circuit 32 may also comprise other electronic components in addition to light-emitting diodes LED. Light-emitting diodes LED may be 2D light-emitting diodes, also called planar light-emitting diodes, comprising a stack of planar layers, or 3D light-emitting diodes, each comprising a three-dimensional semiconductor element covered with an active area. In FIG. 22, the light-emitting diodes are shown as being connected with a common anode. It may however be desirable to arrange light-emitting diodes LED according to another configuration. As an example, the light-emitting diodes may be connected with a common cathode, or be connected independently from one another.

According to an embodiment, display pixel $12_{i,j}$ comprises three display sub-pixels emitting light at first, second, and third wavelengths. According to an embodiment, the first wavelength corresponds to blue light and is within the range from 430 nm to 490 nm. According to an embodiment, the second wavelength corresponds to green light and is within the range from 510 nm to 570 nm. According to an embodiment, the third wavelength corresponds to red light and is within the range from 600 nm to 720 nm. As a variation, the display pixel $12_{i,j}$ can comprise only one light source emitting light at the first, second, or third wavelength, or only two light sources emitting light at two wavelengths among the first, second, and third wavelengths.

Each conductive pad P_Gnd, P_Vcc, P_Col, P_Row is intended to be connected to one of electrodes $14_i$, $16_j$, $18_i$, $20_j$ schematically shown in FIG. 22. The first conductive pad P_Gnd is coupled to the source of low reference potential Gnd. The second conductive pad P_Vcc is coupled to the source of high reference potential Vcc. The third conductive pad P_Row is coupled to row electrode $18_i$ and receives selection and timing signal $Com_i$. The fourth conductive pad P_Col is coupled to column electrode $20_j$ and receives data signal $Data_j$.

Figure 24:
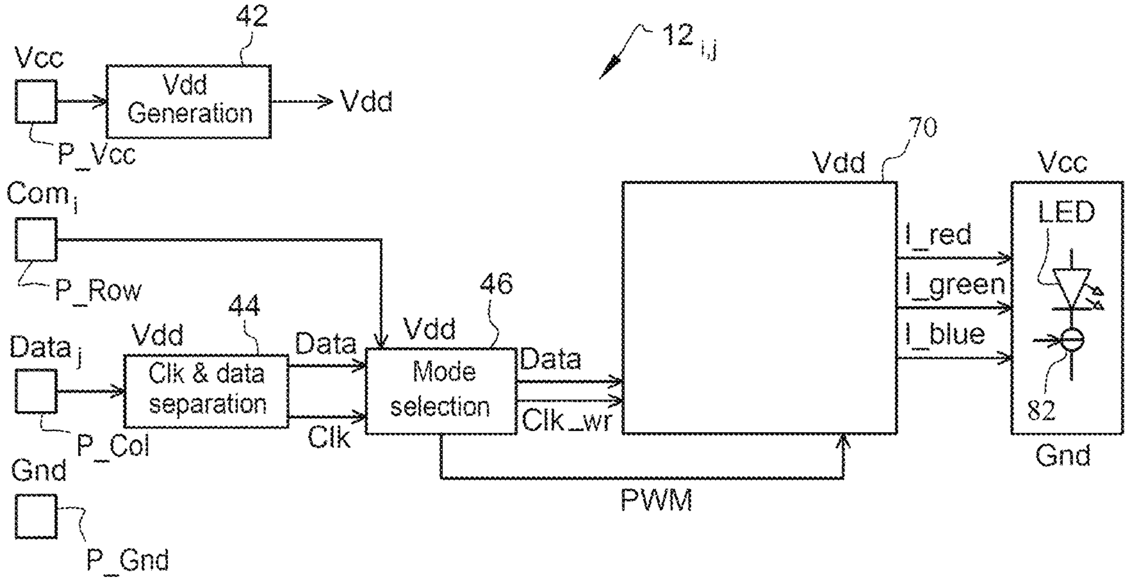
FIG. 24 and FIG. 25 show each a block diagram of the display pixel of FIG. 22.

FIG. 24 shows a known example of a block diagram of a display pixel $12_{i,j}$ of display screen 10. In FIG. 24, above each block, the power supply voltage used to power the electronic components of the blocks has been indicated.

Display pixel $12_{i,j}$ comprises driver circuit 70 for driving controllable current source 82. Driver circuit 70 may particularly comprise electronic components such as MOS transistors. It may be desirable to use a decreased power supply voltage, smaller than 4 V, for example in the order of 1 V or of 1.8 V, to power the electronic components of driver circuit 70, this decreased power supply voltage for example corresponding to the voltage likely to be applied between the power terminals of the MOS transistors. For this purpose, display pixel $12_{i,j}$ comprises a circuit 42 (Vdd Generation) for delivering, from power supply voltage Vcc, a decreased power supply voltage Vdd particularly used for the power supply of driver circuit 40. Circuit 42 for example comprises a voltage divider.

According to an embodiment, detection and timing signal $Com_i$, received at the conductive pads P_Row of each display pixel $12_{1,j}$, is a binary signal alternating between a low state "0" and a high state "1", the low state corresponding to low reference potential Gnd and the high state "1" corresponding to a low voltage, for example, approximately 1 V, smaller than decreased power supply voltage Vdd. Data signal $Data_j$, received at the conductive pads P_Col of each display pixel $12_{i,j}$, is a binary signal alternating between a low state "0" and a high state "1", the low state corresponding to low reference potential Gnd and the high state "1" corresponding to a low voltage, for example, approximately 1 V, smaller than decreased power supply voltage Vdd.

Display pixel $12_{i,j}$ comprises a circuit 44 (Clk & data separation) coupled to the conductive pad P_Col receiving data signal $Data_j$ and delivering, from data signal $Data_j$, a clock signal Clk and data. Display pixel $12_{i,j}$ comprises a circuit 46 (Mode selection) receiving signals Clk and Data, coupled to the conductive pad P_Row receiving selection and timing signal $Com_i$, and configured to deliver signals Clk_wr and Data or to deliver a PWM signal to driver circuit 70 for controlling the controllable current source 82 associated with each light-emitting diode LED.

As will be described hereafter, to limit the number of conductive pads Gnd, P_Vcc, P_Col, P_Row per display pixel $12_{i,j}$, data signals $Data_j$ enable both the determination, by each display pixel $12_{i,j}$, of a clock signal and of the color signals R, G, B representative of the light intensities desired for the radiations at the first, second, and third wavelengths. As a variation, data signals $Data_j$ can be used only to the determination, by each display pixel $12_{i,j}$, of the color signals R, G, B and the clock signal is received by each pixel $12_{i,j}$, on a separate conductive pad.

Figure 25:
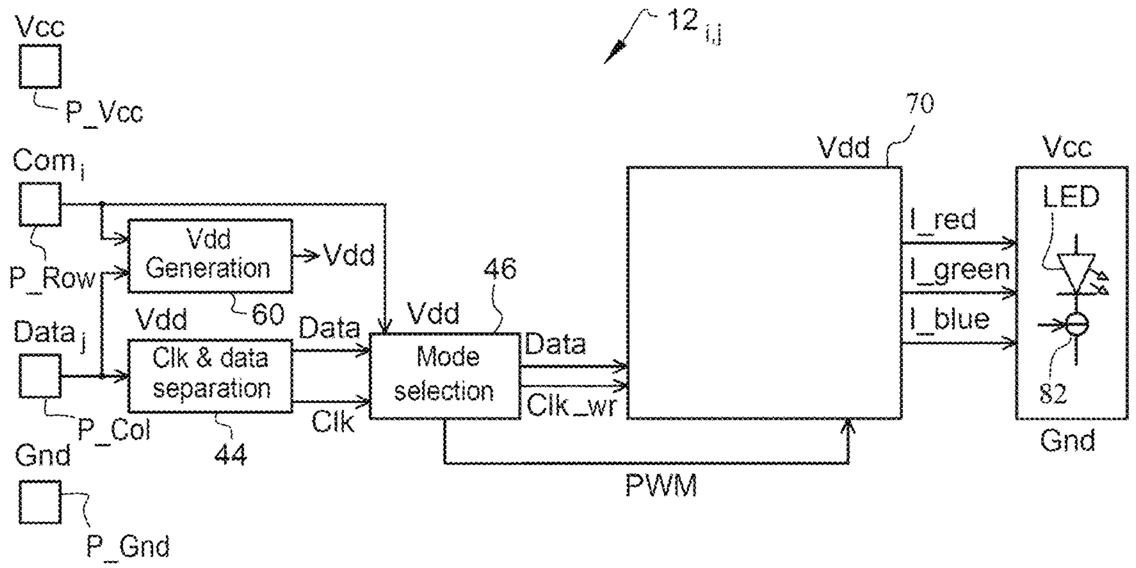

FIG. 25 represents a block diagram of an embodiment of a display pixel $12_{i,j}$. The display pixel $12_{i,j}$ of FIG. 25 has the same structure as the display pixel $12_{i,j}$ of FIG. 24, except that the circuit 42 for supplying the reduced supply voltage Vdd is replaced by a circuit 60 for supplying the reduced supply voltage Vdd receiving the selection and timing signal $Com_i$ and the data signal $Data_j$. In this embodiment, the reduced supply voltage Vdd is provided from the selection and timing signal $Com_i$ and the data signal $Data_j$.

According to an embodiment, for each display pixel $12_{i,j}$, circuit 44 determines clock signal Clk and data Data based on the pulses of data signal $Data_j$. As an example, each pulse of data signal $Data_j$ may have a first lenght or a second lenght, longer than the first lenght. Signal Clk may correspond to a sequence of pulses of same length having their rising edges coinciding, to within a possible constant offset, with the rising edges of the pulses of data signal $Data_j$. Data Data may correspond to a binary signal at state "0" when the pulse of signal $Data_j$ has the first lenght, and at state "1" when the pulse of signal Dataj has the second lenght. Circuit 46, selected by signal $Com_i$ at state "1", delivers, at the rate of clock signal Clk, the data Data which are stored in circuit 70 in the form of digital color signals R, G, B having their bits provided by the successive values of signal Data.

Various embodiments and variants have been described. Those skilled in the art will understand that certain features of these embodiments can be combined and other variants will readily occur to those skilled in the art. In particular, in the previously disclosed embodiments, the light-emitting diodes have a common anode, that is to say the anodes of the light-emitting diodes receive the high reference voltage and the cathodes of the light-emitting diodes are connected to the controllable current source. However, these embodiments also apply to display pixels in which the light-emitting diodes have a common cathode, that is to say the cathodes of the light-emitting diodes receive the low reference voltage and the anodes of the light-emitting diodes are connected to the controllable current source.

Finally, the practical implementation of the embodiments and variants described herein is within the capabilities of those skilled in the art based on the functional description provided hereinabove.

The invention claimed is:

1. Display pixel for a display screen comprising a light-emitting circuit comprising at least a first electroluminescent source, a controllable current source for driving the light-emitting circuit with current pulses and a driver circuit for controlling the current source, the driver circuit being configured to receive a digital signal comprising first bits and one second bit, the second bit being different from the first bits, and to control the current source for supplying the current pulses modulated by pulse-width modulation and modulated by pulse-amplitude modulation based on the bits of the digital signal, wherein the driver circuit is configured to command the current source to provide a current that is the sum of successive first current pulses having a constant intensity and first durations that depend on the first bits of the digital signal and a second current pulse commanded by the second bit of the digital signal and having a constant second duration, the sum of the first durations being inferior or equal to the second duration.

2. Display pixel according to claim 1, wherein the current source is configured to generate the successive first current pulses while the second current pulse is generated.

3. Display pixel according to claim 1, wherein the bits of the digital signal are ranked from the most significant bit to the least significant bit and wherein the intensity of the second current pulse depends on the rank of the second bit of the digital signal.

4. Display pixel according to claim 1, wherein the second bit comprises the most significant bit of the digital signal.

5. Display pixel according to claim 3, wherein the digital signal comprises a third bit different from the first bits and the second bit, and wherein the driver circuit is configured to command the controllable current source to provide the current that is the sum of the successive first current pulses, the second current pulse, and a third current pulse commanded by the third bit of the digital signal and having the second duration.

6. Display pixel according to claim 5, wherein the current source is configured to generate the third current pulse simultaneously with the second current pulse.

7. Display pixel according to claim 5, wherein the intensity of the third current pulse depends on the rank of the third bit of the digital signal and is different from the intensity of the second current pulse.

8. Display pixel according to claim 7, wherein the third bit is the second most significant bit of the digital signal.

9. Display pixel according to claim 5, wherein the digital signal comprises a fourth bit different from the first bits, the second bit, and the third bit, and wherein the driver circuit is configured to command the controllable current source to provide the current that is the sum of the successive first current pulses, the second current pulse, the third current pulse, and a current fourth pulse commanded by the fourth bit of the digital signal and having the second duration.

10. Display pixel according to claim 9, wherein the current source is configured to generate the fourth current pulse simultaneously with the second current pulse.

11. Display pixel according to claim 9, wherein the intensity of the fourth current pulse depends on the rank of the fourth bit of the digital signal and is different from the intensity of the second current pulse and the intensity of the third current pulse.

12. Display pixel according to claim 11, wherein the fourth bit is the third most significant bit of the digital signal.

13. Display pixel according to claim 1, wherein the driver circuit comprises a first storage circuit for storing said first bits of the digital signal and wherein the first storage circuit comprises a shift register clocked by a pulse-width modulation clock signal.

14. Display pixel according to claim 13, wherein the driver circuit comprises a second storage circuit for storing said second bit of the digital signal, and a logic circuit controlled by a control signal and configured to receive successively the first bits from the shift register clocked by the pulse-width modulation clock signal and to receive said second bit from the second storage circuit and to control the controllable current source from the successively received first bits and the second bit when the control signal is in a given state.

15. Display pixel according to claim 1, wherein the light-emitting circuit comprises a first group of electroluminescent sources having a first number of electroluminescent sources and a second group of electroluminescent sources having a second number of electroluminescent sources, wherein the controllable current source comprises a first controllable current source commanded by the first bits and connected to the electroluminescent sources of the first group and a second controllable current source commanded by the second bit and connected to the electroluminescent sources of second group.

16. Display pixel according to claim 1, wherein the controllable current source comprises:

- a first MOS transistor connected to the light-emitting circuit (LEDS) and a first switch connected to the first MOS transistor; and
- a second MOS transistor connected to the light-emitting circuit and a second switch connected to second MOS transistor.

17. Display pixel according to claim 16, wherein the logic circuit is configured to control the first switch successively from each first bit, and to control the second switch based on said second bit.

18. Display pixel according to claim 17, wherein the driver circuit is configured to control only the first switch based on some the first bits and to control both the first switch and the second switch based on the other of the first bits.

19. Display pixel according to claim 15, wherein the electroluminescent sources of the first group of electroluminescent sources are connected to the first MOS transistor and wherein the electroluminescent sources of the second group are connected to the second MOS transistor.

20. Display pixel according to claim 19, wherein the light-emitting circuit comprises a third group of electroluminescent sources having a third number of electroluminescent sources and wherein the control source comprises a third MOS transistor connected to the electroluminescent sources of the third group and a third switch connected to the third MOS transistor wherein the first number is equal to the second number, and wherein the third number is greater than the second number.

21. Display screen comprising an array of display pixels according to claim 1.

22. Display screen according to claim 21, comprising a circuit configured to modify a supply voltage of the display pixels according to the second bit.

* * * * *